United States Patent
Yi et al.

(10) Patent No.: US 9,591,632 B2
(45) Date of Patent: Mar. 7, 2017

(54) METHOD AND APPARATUS FOR TRANSMITTING AND RECEIVING DATA IN A WIRELESS COMMUNICATION SYSTEM

(71) Applicant: LG Electronics Inc., Seoul (KR)

(72) Inventors: Yunjung Yi, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/440,623

(22) PCT Filed: Nov. 6, 2013

(86) PCT No.: PCT/KR2013/010035
§ 371 (c)(1),
(2) Date: May 5, 2015

(87) PCT Pub. No.: WO2014/073865
PCT Pub. Date: May 15, 2014

(65) Prior Publication Data
US 2015/0304995 A1    Oct. 22, 2015

Related U.S. Application Data

(60) Provisional application No. 61/723,298, filed on Nov. 6, 2012, provisional application No. 61/723,747, filed
(Continued)

(51) Int. Cl.
*H04W 4/00* (2009.01)
*H04W 72/04* (2009.01)
(Continued)

(52) U.S. Cl.
CPC ......... *H04W 72/042* (2013.01); *H04L 1/0046* (2013.01); *H04L 1/0067* (2013.01);
(Continued)

(58) Field of Classification Search
None
See application file for complete search history.

(56) References Cited

U.S. PATENT DOCUMENTS

2014/0071918 A1* 3/2014 Park ................. H04W 72/14
                                                      370/329
2014/0078980 A1* 3/2014 Frenne .............. H04L 5/0007
                                                      370/329
(Continued)

OTHER PUBLICATIONS

CMCC, "Search Space Design for Localized ePDCCH," R1-124425, 3GPP TSG RAN WG1 #70bis, San Diego, USA Oct. 8-12, 2012, see pp. 1-5.
(Continued)

*Primary Examiner* — Minh-Trang Nguyen
(74) *Attorney, Agent, or Firm* — Dentons US LLP

(57) ABSTRACT

A method for and apparatus for transmitting and receiving data in a wireless communication system supporting multiple carriers is provided. A wireless device determines a starting OFDM symbol of a physical downlink shared chancel (PDSCH) which is variably located by presence of reference signal (RS), a number of physical resource block (PRB)s used for an enhanced physical downlink control channel (ePDCCH), and receives the ePDCCH. The ePDCCH is set by one or more sets of PRBs within the PDSCH configured for a UE to monitor the ePDCCH. Thus, more efficient and accurate scheduling with lower complexity and reduction of control overhead of a master cell (as PCell), for multi-UEs and variable control information transmissions are supported in this invention.

17 Claims, 11 Drawing Sheets

Related U.S. Application Data on Nov. 7, 2012, provisional application No. 61/729,629, filed on Nov. 25, 2012, provisional application No. 61/750,815, filed on Jan. 10, 2013.

(51) Int. Cl.
*H04L 5/00* (2006.01)
*H04L 27/26* (2006.01)
*H04L 1/00* (2006.01)

(52) U.S. Cl.
CPC ............ *H04L 1/0072* (2013.01); *H04L 5/001* (2013.01); *H04L 5/0007* (2013.01); *H04L 5/0048* (2013.01); *H04L 5/0053* (2013.01); *H04L 5/0094* (2013.01); *H04L 27/2647* (2013.01)

(56) References Cited

U.S. PATENT DOCUMENTS

2016/0043849 A1* 2/2016 Lee ................ H04W 72/042
370/329
2016/0080963 A1* 3/2016 Marinier ............ H04L 5/0053
370/252

OTHER PUBLICATIONS

LG Electronics, "On Subframe monitoring operation for ePDCCH," R1-124324, 3GPP TSG RAN WG1 #70bis, San Diego, USA, Oct. 8-12, 2012, see pp. 1-3.

Nokia Diemens Networks et al., "General considerations on new carrier types," R1-120711, 3GPP TSG RAN WG1 #68, Dresden, Germany, Feb. 6-10, 2012, see pp. 1-4.

Zte et al., "Way forward on downlink control signaling for PDSCH RE mapping and quasi-co-location of CSI-RS and DMRS for TM10," R1-124623, 3GPP TSG RAN WG1 #70bis, San Diego, USA, Oct. 8-12, 2012, see pp. 1-4.

Nec Group, "On PDSCH RE mapping in CoMP," R1-124295, 3GPP TSG RAN WG1 #70bis, San Diego, USA, Oct. 8-12, 2012, see pp. 1-6.

\* cited by examiner

US 9,591,632 B2

METHOD AND APPARATUS FOR TRANSMITTING AND RECEIVING DATA IN A WIRELESS COMMUNICATION SYSTEM

This application is a 35 USC §371 National Stage entry of International Application No. PCT/KR2013/010035 filed on Nov. 6, 2013, and claims priority to U.S. Provisional Application No. 61/723,298 filed on Nov. 6, 2012; 61/723,747 filed on Nov. 7, 2012; 61/729,629 filed on Nov. 25, 2012 and 61/750,815 filed on Jan. 10, 2013, all of which are hereby incorporated by reference in their entireties as if fully set forth herein.

TECHNICAL FIELD

The present invention relates to wireless communications, and more particularly, to a method and apparatus for transmitting and receiving data and control in a wireless communication system supporting multiple carriers.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The ccommercialization of the 3GPP LTE (A) system is being recently accelerated. The LTE systems are spread more quickly as respond to users?demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. An efficient allocation scheme for the efficient cell planning including a new carrier which is not necessarily transmitted control and reference signals is highly needed to define.

DISCLOSURE

Technical Problem

The present invention provides a method and apparatus for transmitting and receiving data and control in a wireless communication system supporting multiple carriers.

The present invention also provides a method and apparatus for scheduling of ePDCCH multiplexed with PDSCH in a wireless communication system supporting multiple carriers.

The present invention also provides a method and apparatus for determining transport block size variable with presence of reference signal (RS)s in a wireless communication system supporting multiple carriers.

Technical Solution

In an aspect, a method for transmitting and receiving data in a wireless communication system supporting multiple carrier is provided. The method may include determining a starting OFDM symbol of a physical downlink shared chancel (PDSCH) which is variably located by presence of reference signal (RS), determining a number of physical resource block (PRB)s used for an enhanced physical downlink control channel (ePDCCH), and determining the ePDCCH.

The method may further include the ePDCCH is set by one or more sets of PRBs within the PDSCH configured to a UE to monitor the ePDCCH.

The method may further include determining a number of PRBs used for the ePDCCH which is allocated with PDSCH PRBs of a resource allocation by a Downlink Control Information (DCI), a number of PRBs overlapped between the PDSCH PRBs and the ePDCCH PRBs by the DCI, or a number of PRBs between the PDSCH PRBs and the ePDCCH PRBs are localized or distributed.

In another aspect, a wireless device for transmitting and receiving data in a wireless communication system supporting multiple carriers is provided. The wireless device includes a radio frequency unit for receiving a radio signal; and a processor, operatively coupled with the radio frequency unit, configured to: determine a starting OFDM symbol of a physical downlink shared chancel (PDSCH) which is variably located by presence of reference signal (RS), determining a number of physical resource block (PRB)s used for an enhanced physical downlink control channel (ePDCCH), and determining the ePDCCH, wherein the ePDCCH is set by one or more set of PRBs within the PDSCH configured to a UE to monitor the ePDCCH.

Advantageous Effects

This invention provides enhanced communication system, a new form of a carrier or cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. Thus, more efficient and accurate scheduling with lower complexity and reduction of control overhead of a master cell (as PCell), for multi-UEs and variable control information transmissions are supported in this invention.

MODE FOR INVENTION

Figure 1:
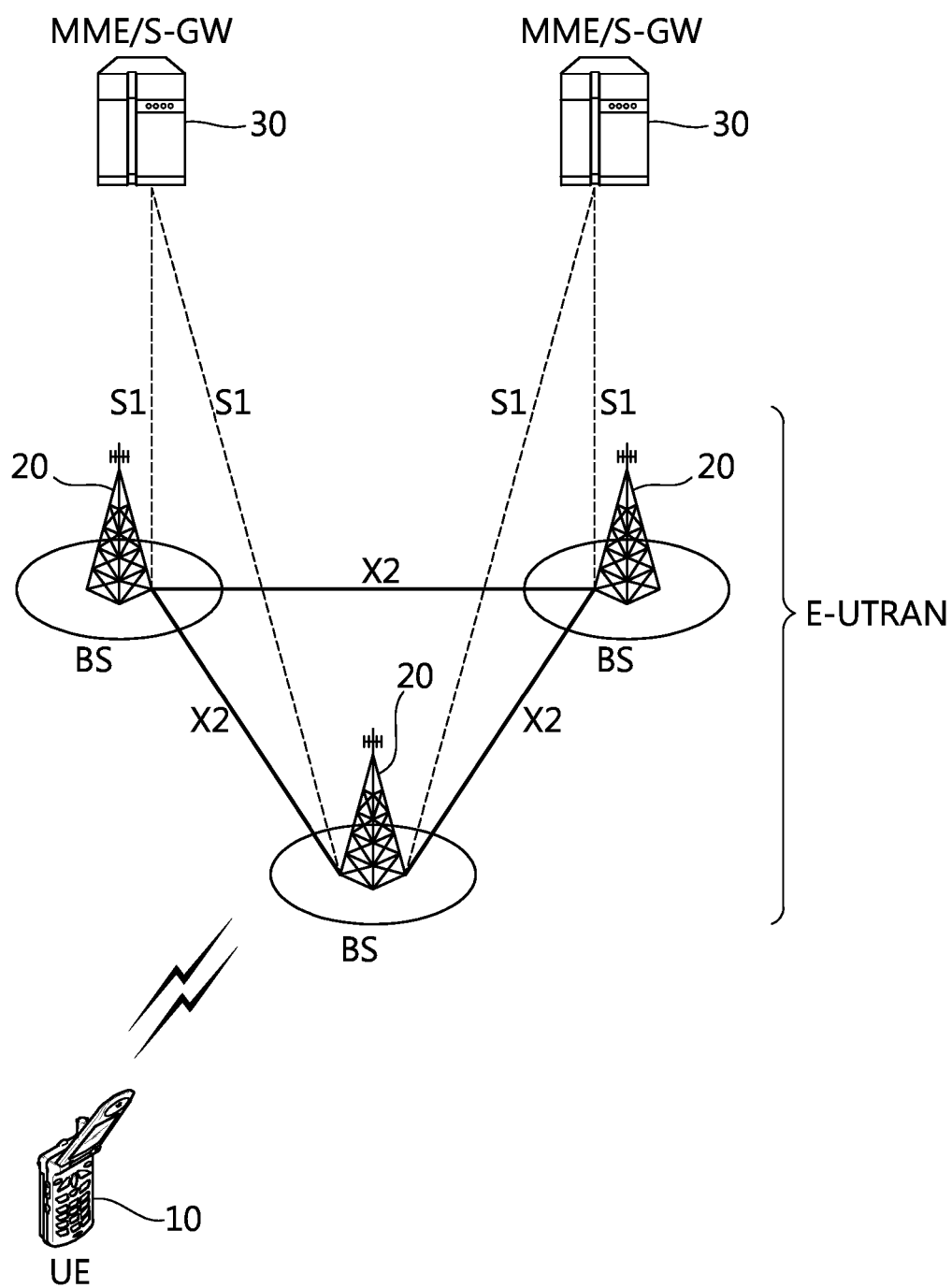
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
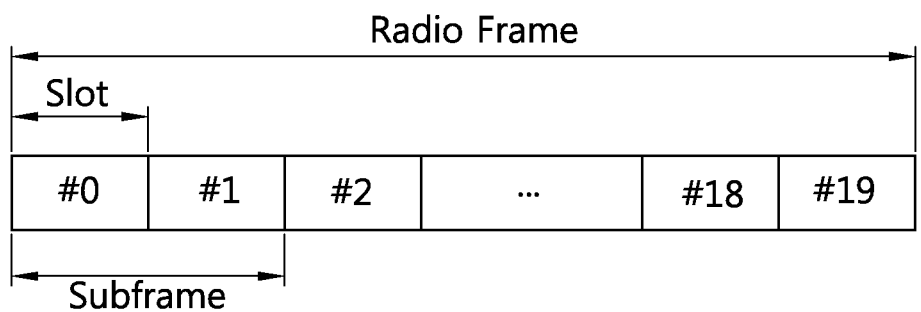
FIG. 2 shows a structure of a radio frame to which the present invention is applied.

FIG. 2 shows a structure of a radio frame to which the present invention is applied.

Referring to FIG. 2, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE and may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration (configuration) of the CP (Cyclic Prefix).

The CP includes an extended CP (CP) and a normal CP (normal CP). For example, if normal CP case, the OFDM symbol is composed by 7. If configured by the extended CP, the extended CP includes 6 OFDM symbols in one slot. If the channel status is unstable such as moving at a fast pace UE, the extended CP can be configured to reduce an inter-symbol interference more.

Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with the changeable manners to a corresponding system.

Figure 3:
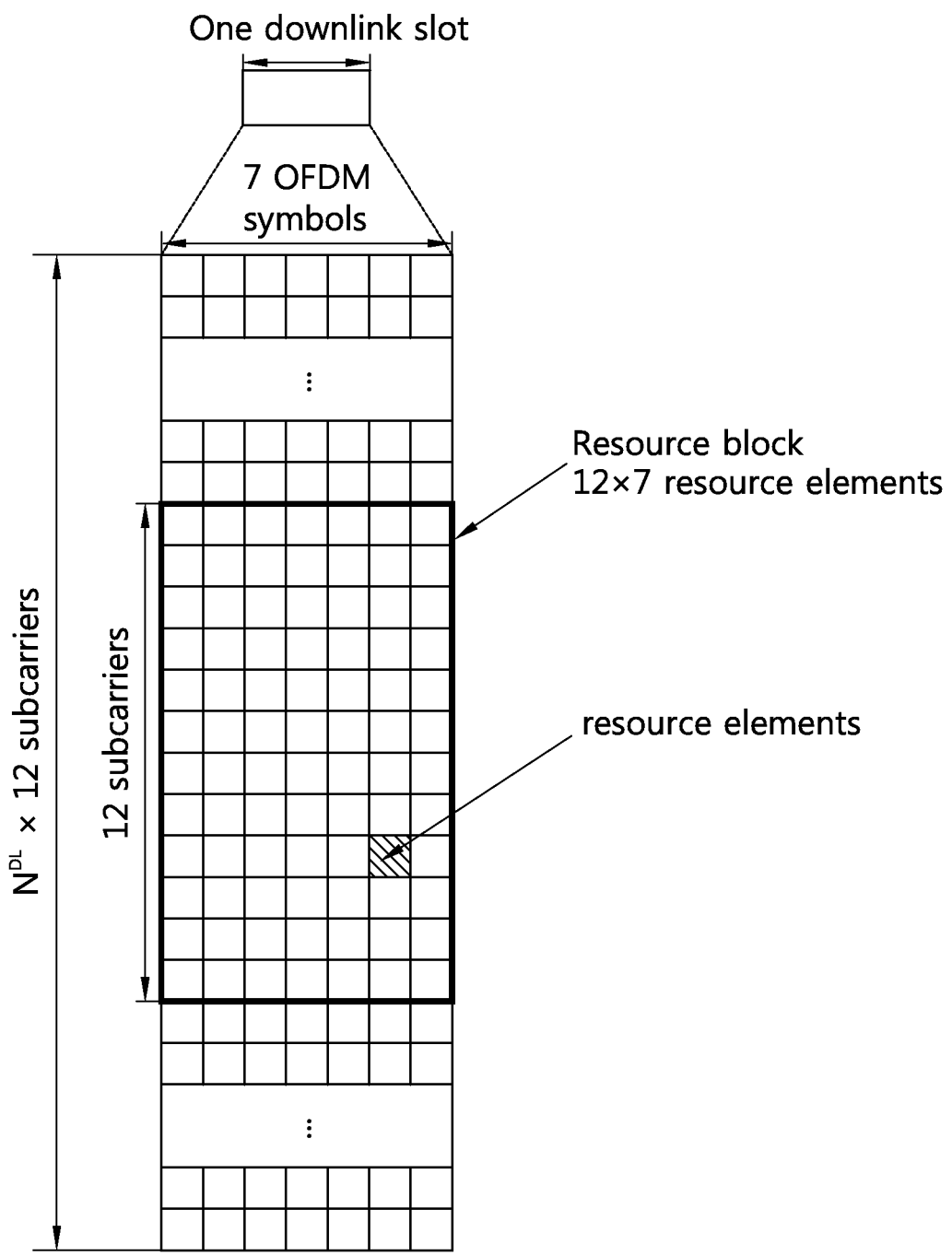
FIG. 3 is an exemplary diagram showing a resource grid for one downlink slot to which the present invention is applied.

FIG. 3 is an exemplary diagram showing a resource grid for one downlink slot to which the present invention is applied.

Referring to FIG. 3, the downlink slot includes a plurality of OFDM symbols in the time domain. Here, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7(6)REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 4:
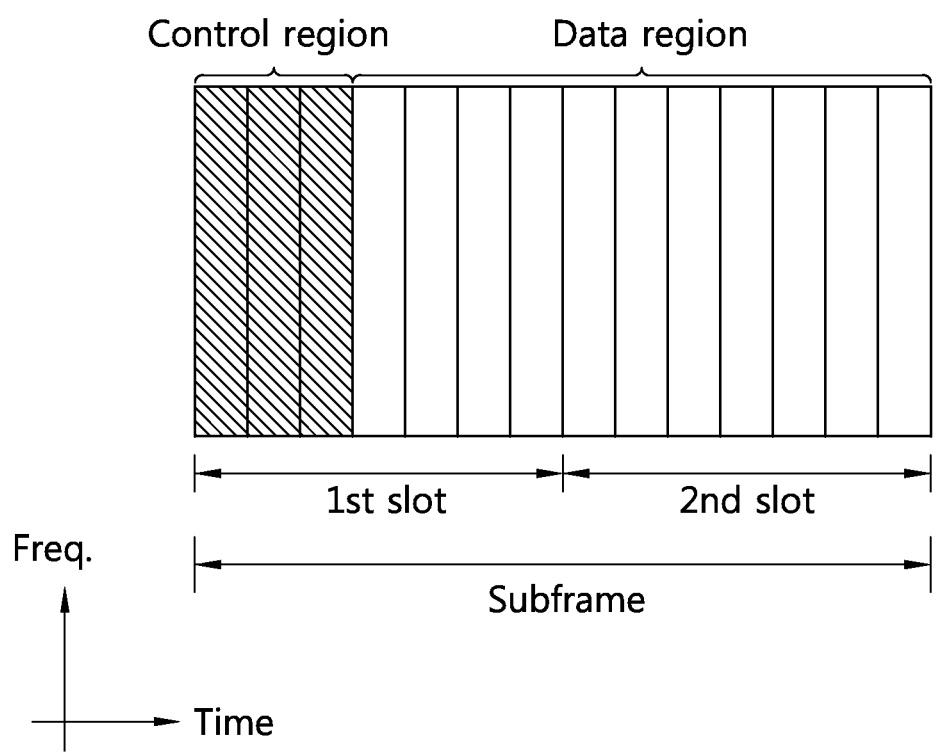
FIG. 4 shows a structure of a downlink subframe to which the present invention is applied.

FIG. 4 shows a structure of a downlink subframe to which the present invention is applied.

Referring to FIG. 4, a subframe includes two slots. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated.

Examples of downlink control channels used in the 3GPP LTE include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH, that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs.

The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI. Table 2 shows DCIs according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH which is referred to as a downlink (DL) grant, resource allocation of a PUSCH which is referred to as an uplink (UL) grant), a set of transmit power control commands for individual UEs in any UE group and/or activation of a voice over Internet protocol (VoIP). The following Table 3 shows the DCI of Format 0 which includes uplink resource allocation information or an uplink grant.

TABLE 3

-Carrier indicator-0 or 3 bits
-Flag for identifying Format 0/Format 1A-1 bit, 0 indicates Format 0, 1 indicates Format 1A.
-Frequency hopping flag-1 bit, is a Most Significant Bit (MSB) corresponding to resource allocation at need and used to assign multiple clusters.
-Resource block assignment and hopping resource allocation- $\lceil \log_2(N_{RB}^{UL}(N_{RB}^{UL} + 1)/2) \rceil$ bits
  -PUSCH hopping (corresponding to only single cluster assignment):
    -$N_{UL\_hop}$ MSBs are used to obtain an $n_{PRB}(i)$ value.
    -$(\lceil \log_2(N_{RB}^{UL}(N_{RB}^{UL} + 1)/2) \rceil - N_{UL\_hop})$ bits provide the resource allocation of the first slot of an uplink subframe.
  -In single cluster assignment, non-hopping PUSCH
    -$(\lceil \log_2(N_{RB}^{UL}(N_{RB}^{UL} + 1)/2) \rceil)$ bits provide the resource allocation of an uplink subframe.
  -In multi-cluster assignment, non-hopping PUSCH: Resource assignment is obtained from a combination of a frequency hopping flag field and a resource block assignment and hopping resource allocation field.

$$\left\lceil \log_2\left(\binom{\lceil N_{RB}^{UL}/p + 1 \rceil}{4}\right) \right\rceil$$

bits provide resource allocation in an uplink subframe.
  Wherein, P depends on the number of downlink resource blocks.
-Modulation and coding scheme/redundancy version-5 bits
-New data indicator-1 bit
-TPC command for a scheduled PUSCH-2 bits
-Cyclic shift and OCC index for DM RS-3 bits
-Uplink index-2 bits, only exist for a TDD operation, that is, an uplink-downlink configuration 0
-Downlink Assignment Index (DAI)-2 bits, only exist for TDD operations, that is, uplink-downlink configurations 1-6
-CQI request-1 or 2 bits, a 2 bit field is applied to a UE configured using at least one downlink cell.
-SRS request-0 or 1 bit.
-Multi-cluster flag-1 bit.

Here, the flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

In Table 3, for example, if the resource allocation field has 13 bits in a band of an FDD 20 MHz, an uplink grant has a total of 27 bits except a CIF field and a CRC field. If the length of bits determined as the input of blind decoding is 28 bits, an eNB makes the uplink grant the total number of 28 bits by adding the redundant bits of 1 bit to the uplink grant at the time of scheduling. Herein, all the redundant bits may be set to 0 because they do not include special information. Of course, the number of redundant bits may be smaller than or greater than 2.

The wireless communication system of the present invention uses blind decoding for PDCCH detection. The blind decoding is a scheme in which a desired identifier is demasked from a CRC of a PDCCH to determine whether the PDCCH is its own channel by performing CRC error checking. An eNB determines a PDCCH format according to DCI to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and system information RNTI (SI-RNTI) may be masked to the CRC. To indicate a random access response that is a response for transmission of a random access preamble of the UE, a random access-RNTI (RA-RNTI) may be masked to the CRC.

Figure 5:
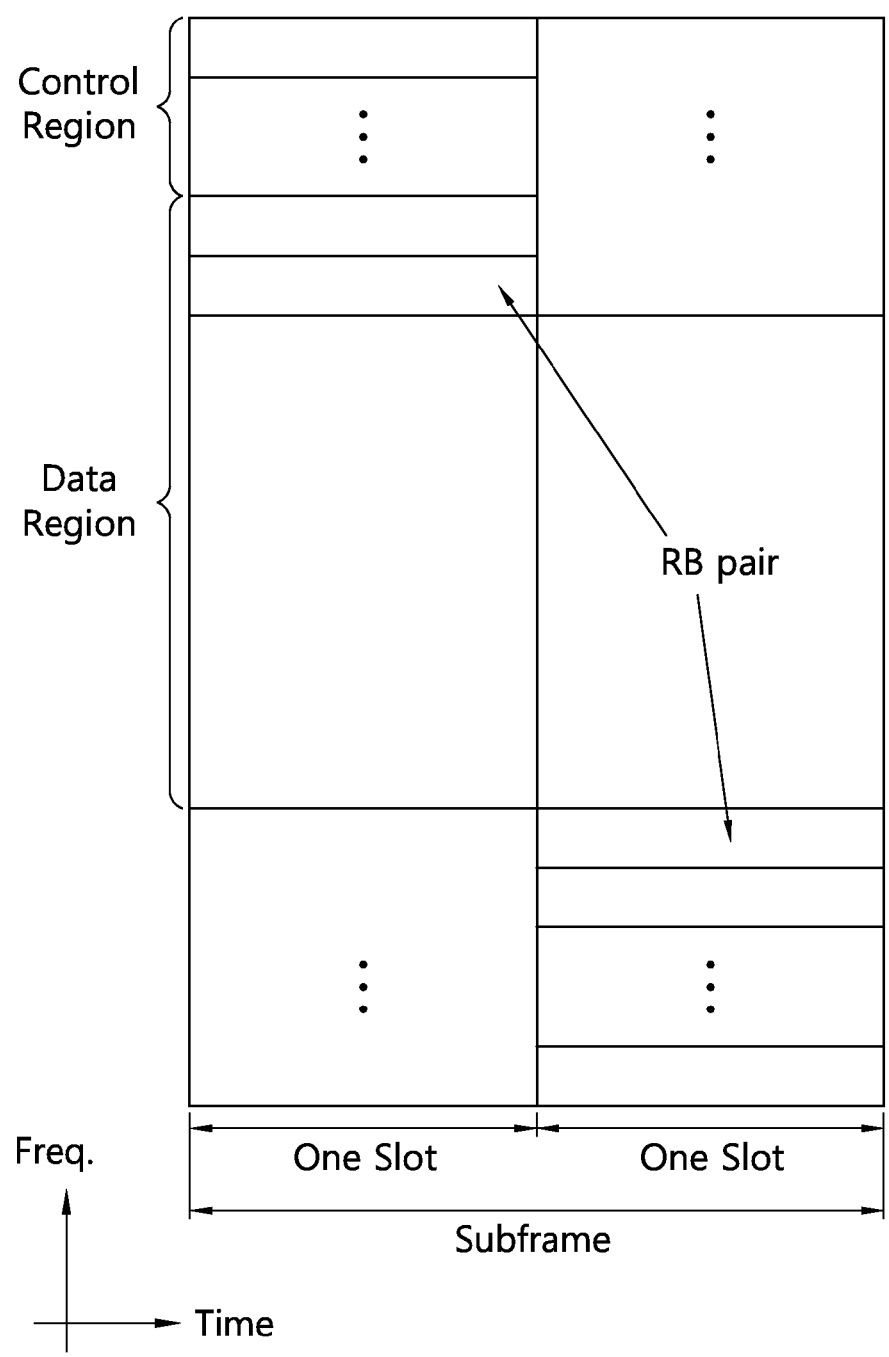
FIG. 5 is a view illustrating an example of a structure of an uplink subframe carrying an ACK/NACK signal to which the present invention is applied.

FIG. 5 is a view illustrating an example of a structure of an uplink subframe carrying an ACK/NACK signal to which the present invention is applied.

Referring to FIG. 5, an uplink subframe may be divided into a control region to which a physical uplink control channel (PUCCH) that carries uplink control information is allocated, the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair are resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. Meanwhile, as the increased demands for the high data rate transmission, the mobile communication system composed of aggregated multiple CCs (component carriers) is being researched.

In general, data can suffer from easily through wireless channel so called frequency selective channel. So reference signal (RS) that already known to both Tx and Rx should be transmitted with data information at the same time for channel estimation.

Figure 6:
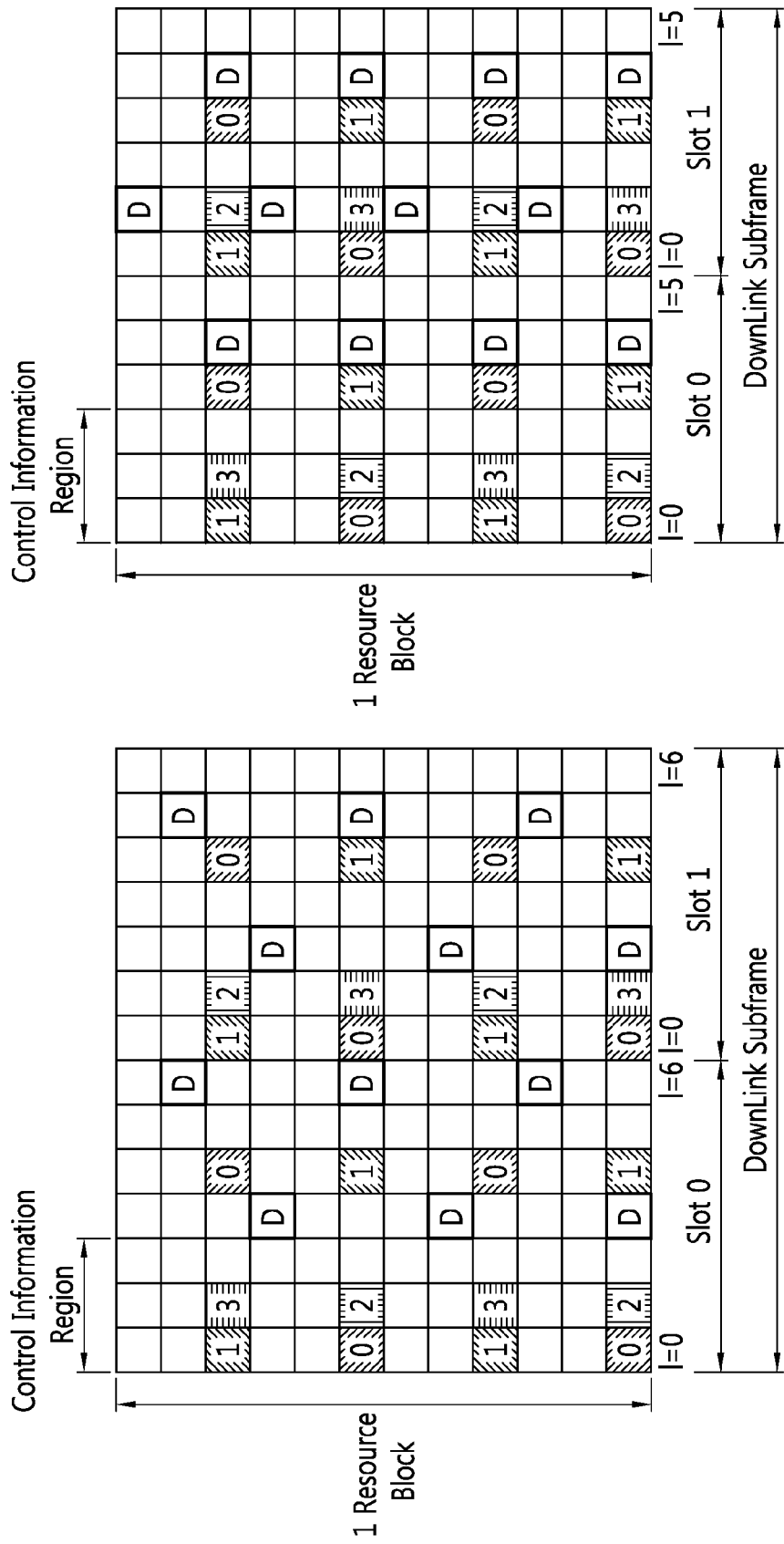
FIG. 6 is a view illustrating an example of a RS structure of both normal CP case and extended CP case to which the present invention is applied.

FIG. 6 is a view illustrating an example of a RS structure of both normal CP case and extended CP case to which the present invention is applied.

Referring to FIG. 6, there are two kinds of roles which RS should do such as demodulation and channel measurement. Depending on the knowledge of the existence of RS, RS can be classified into a dedicated RS (DRS) and a common RS (CRS). That is to say, the DRS is for a specific UE and the CRS is for all UEs. A RS for CQI/PMI/RI reporting channel quality indicator is called CRS (CSI-RS). The DRS can be called as UE-specific RS.

Here, 0, 1, 2, 3 mean cell specific common RS to be transmitted for channel measurement and data demodulation commonly for each antenna port 0-3. In addition, UE-specific RS, D is supported for single-antenna port transmission of PDSCH. The UE is informed by higher layers whether the UE-specific RS is present or not and is a valid when only corresponding PDSCH is mapped. The UE specific RS is just transmitted in resource elements if data demodulation is needed.

On the other hand, RS mapping rules into resource block are following as Equation 1.

CRS      ⟨Equation 1⟩

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL},$$

$$v_{shift} = N_{ID}^{cell} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

DRS
Normal CP $$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

-continued $$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots 3N_{RB}^{PDSCH} - 1,$$

$$v_{shift} = N_{ID}^{cell} \bmod 3$$

Extend CP $$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

Here, k and p mean subcarrier index and antenna port. And, $N_{RB}^{DL}$, $n_s$, $N_{ID}^{Cell}$ mean number of RB allocated for DL, slot index, cell ID. Note that given RS positioning depends on V-shift values in terms of frequency domain.

UE-specific reference signals are supported for transmission of PDSCH and are transmitted on antenna port(s) p=5, p=7, p=8 or p=7, 8, ..., v+6, where v is the number of layers used for transmission of the PDSCH. UE-specific reference signals are present and are a valid reference for PDSCH demodulation only if the PDSCH transmission is associated with the corresponding antenna port. UE-specific reference signals are transmitted only on the resource blocks upon which the corresponding PDSCH is mapped. The UE-specific reference signal is not transmitted in resource elements (k, l) in which one of the physical channels or physical signals other than UE-specific reference signal are transmitted using resource elements with the same index pair (k, l) regardless of their antenna port p.

MBSFN reference signals shall be transmitted in the MBSFN region of MBSFN subframes only when the PMCH is transmitted. MBSFN reference signals are transmitted on antenna port 4. MBSFN reference signals are defined for extended cyclic prefix only.

Positioning reference signals shall only be transmitted in resource blocks in downlink subframes configured for positioning reference signal transmission. If both normal and MBSFN subframes are configured as positioning subframes within a cell, the OFDM symbols in a MBSFN subframe configured for positioning reference signal transmission shall use the same cyclic prefix as used for subframe #0. If only MBSFN subframes are configured as positioning subframes within a cell, the OFDM symbols configured for positioning reference signals in the MBSFN region of these subframes shall use extended cyclic prefix length. In a subframe configured for positioning reference signal transmission, the starting positions of the OFDM symbols configured for positioning reference signal transmission shall be identical to those in a subframe in which all OFDM symbols have the same cyclic prefix length as the OFDM symbols configured for positioning reference signal transmission. Positioning reference signals are transmitted on antenna port6. The positioning reference signals shall not be mapped to resource elements (k, l) allocated to PBCH, PSS or SSS regardless of their antenna port p. Positioning reference signals are defined for Δf=15 kHz only.

CSI reference signals are transmitted on one, two, four or eight antenna ports using p=15, p=15, 16, p=15, ..., 18 and p=15, ..., 22, respectively. CSI reference signals are defined for Δf=15 kHz only.

Figure 7:
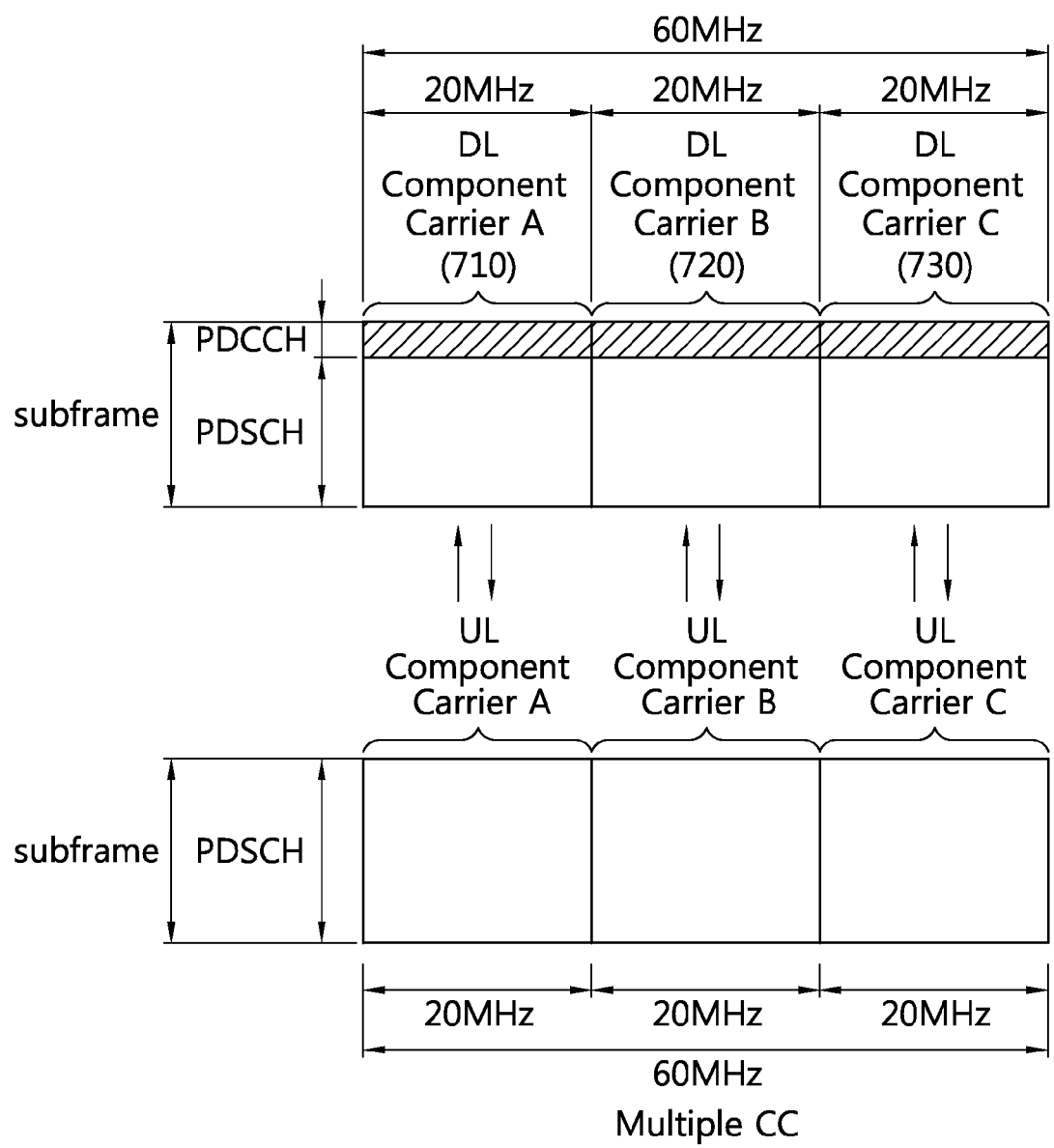
FIG. 7 shows an exemplary concept for a carrier aggregation (CA) technology according to an exemplary embodiment of the present invention.

FIG. 7 shows an exemplary concept for a carrier aggregation (CA) technology according to an exemplary embodiment of the present invention.

Referring to FIG. 7, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

Hereinafter, a CC may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or a RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a $7^{th}$ bit from the left., which are the remaining indices other than 0, i.e., the index of the Pcell. Herein, the index of the serving cell may be a logical index determined relatively for each UE, or may be a physical index for indicating a cell of a specific frequency band. And the CA system supports a non-cross carrier scheduling (self-carrier scheduling) or, cross carrier scheduling.

In legacy LTE system, FDD DL carrier subframe or TDD DL subframe starts with a few symbols of control channels such as PDCCH, PHICH and PCFICH and use the rest symbols to transmit PDSCH. The number of OFDM symbols used for control channels can be dynamically indicated by PCFICH or semi-statically by RRC signaling to UE. That is, CRS and control channels, such as PCFICHs/PDCCHs/PHICHs over some OFDM symbol(s) of the former part, are transmitted through all DL subframes (i.e., an SF) for a specific carrier other than a DL subframe configured for a special purpose (e.g., an MBSFN). Accordingly, backward compatibility for access by existing UE and for providing service to existing UE can be guaranteed. In contrast, in the next LTE system or enhanced communication system, a new form of a carrier (or cell) may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features (e.g., 8Tx MIMO).

The present invention includes that a carrier is defined as a cell with new carrier form with an optimized type to transmit a Reference Signal (RS) or control channels. The DL resources can be efficiently used by improving the performance of DL reception and minimizing RS overhead through the reception of DM-RS-based DL data transmitted in a UE-specific way (i.e., precoded) and the measurement of a channel status based on a configurable CSI-RS having relatively low density, instead of omitting or significantly reducing fixed CRS transmission having high density i.e., the reception of DL data and the measurement of a channel status dependent on the CRS transmission basically in a new cell. Accordingly, a method of performing DL data scheduling using a new cell may be taken into consideration by managing legacy RSs, that is, configured as the DL Transmission Mode (TM) of UE to which an new carrier has been allocated, in particular, only TMs (e.g., TM mode 8 or 9) based on a DM-RS, from among the above-defined DL TMs. Also, synchronization/tracking and various types of measurement may need to be performed on a new carrier for efficiency. That is, there is a need of a new carrier for an efficient cell planning since the Pcell is completely saturated with transmitting and receiving control signals and reference signals between eNB and UE, also the Pcell needs more resources to control the UE with one more Scells for CA.

Figure 8:
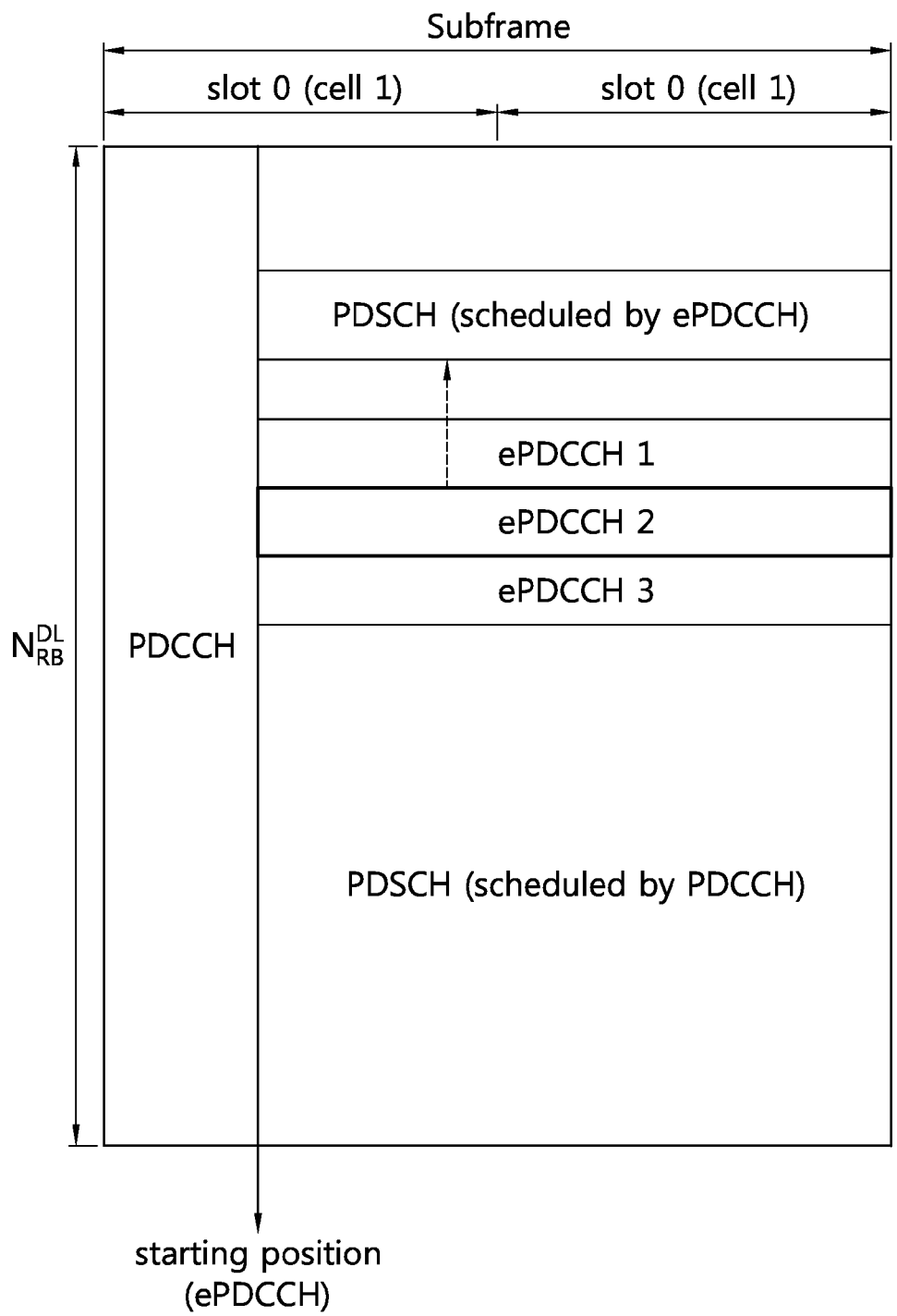
FIG. 8 shows an exemplary concept for an enhanced PDCCH (ePDCCH) which can be multiplexed with PDSCH according to an exemplary embodiment of the present invention.

To solve the number of OFDM symbols used for PDCCHs is limited, an enhanced PDCCH (ePDCCH) which can be multiplexed with PDSCH can be employed as shown in FIG. 8.

Referring to FIG. 8, the enhanced PDCCH (EPDCCH) can be placed in data region which conveys control information. So, the UE can monitor a plurality of PDCCH/EPDCCHs within the control region and/or data region. As the PDCCH is transmitted on CCE, EPDCCH can be transmitted on ECCE (enhanced CCE) as an aggregation of some contiguous CCEs, the ECCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new carrier NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling.

Meanwhile, the UE shall first determine the modulation order and transport block size(s) in the physical downlink shared channel by reading the 5-bit modulation and coding scheme/redundancy version field in a DCI. But a new carrier may not carry legacy PDCCH, and thus ePDCCH and PDSCH may start the first OFDM symbol in each subframe. For a new carrier type, two approaches are feasible. One approach is to eliminate CRS and PDCCH entirely from transmission and thus all subframes are operated based on DM-RS and EPDCCH. Another approach is to allow occasional CRS and PDCCH transmission such that subset of subframes may carry CRS and PDCCH or may carry discovery signals and PDCCH. When CRS and PDCCH are not transmitted, it can be assumed that EPDCCH and PDSCH may start at the first OFDM symbol. Thus, the starting OFDM symbol may change subframe-by-subframe or changed semi-statically or decided implicitly based on some other signals or configurations such as restricted measurement set where restricted measurement set 0 would be assumed as carrying CRS and restricted measurement set 1 would be assumed as not carrying CRS/PDCCH and thus EPDCCH/PDSCH may start at the first OFDM symbol.

Furthermore, for an efficient operation for a dense hot spot small cell deployment, it can be further consider to turn on/off cells rather dynamically or semi-statically. It can be assumed that discovery signals which may have different periodicity and/or resource from the currently existing PSS/SSS/CRS or CSI-RS can be transmitted which will be used for cell identification and/or measurement. Proposed ideas of this invention can be applicable to the case where cell on/off is performed and then discovery signals are transmitted. It can be assumed that invention applied to TRS can be applied to discovery signals without loss of generality.

In terms of calculating transport block size per each scheduled PDSCH, a default the number of OFDM symbols assumed in the calculation is 12 in normal CP case. Without having PDCCH in a subframe configured to do so, a new carrier may utilize all 14 OFDM symbols in each subframe to carry PDSCH and thus, TBS may be increased around 15% compared to legacy carrier. Furthermore, new carrier may have subframes where no CRS is transmitted. Assuming a single port, the overhead of CRS would be around 5%. Thus, the difference of available PDSCH resource elements between a legacy subframe and a new carrier subframe without carrying CRS becomes around 20%.

The present invention provides Transport Block Size (TBS) determination or calculation for usage of a new carrier in a wireless communication system.

This invention proposes the following equation 2, here, $N''_{PRB}$ is set to the total number of allocated PRBs, i.e., according to resource allocation. If the transport block is transmitted in new carrier subframe where PDSCH is transmitted starting OFDM symbol 0 and tracking RS (CRS used for tracking) is not transmitted $$N'_{PRB} = \min\{\lfloor N''_{PRB} \times c \rfloor, N_{RB}^{DL}\}, \qquad \text{<Equation 2>}$$

Where c is a constant e.g., c=1.2 in this case.

If the transport block is transmitted in new carrier type subframe where tracking RS is not transmitted where starting OFDM symbols is not zero, then $$N'_{PRB} = \min\{\lfloor N''_{PRB} \times c \rfloor, N_{RB}^{DL}\}, \qquad \text{<Equation 3>}$$

Where c is a constant e.g., c=1.05 in this case, else $N_{PRB} = N'_{PRB}$

If CRS or tracking RS is not present and PDSCH starts at the first OFDM symbol, the value c can be 1.25 to accumulate both extra OFDM symbols and REs not used for tracking RS or CRS.

If the transport block is transmitted in DwPTS of the special subframe in a frame structure type 2, then $N_{PRB} = \max\{\lfloor N'_{PRB} \times 0.75 \rfloor, 1\}$, else, set $N_{PRB} = N'_{PRB}$ In other words, if tracking purposed CRS is not transmitted and PDSCH starts from first OFDM symbol, about 20% of resource increased shall be counted in the selection of TBS.

Moreover, the scaling factor for special subframe can be changed based on the starting index of PDSCH. In current specification, a unified scaling factor 0.75 is used for TBS calculation in special subframe configurations except for configuration 0 and 5 in normal CP (or 0 and 4 in extended CP).

Herein the frame structure type 2 is applicable to TDD to which the present invention is applied. Each radio frame of length $T_f = 307200 \cdot T_s = 10$ ms consists of two half-frames of length $153600 \cdot T_s = 5$ ms each. Each half-frame consists of five subframes of length $30720 \cdot T_s = 1$ ms.

The supported uplink-downlink configurations are listed in Table 5 where, for each subframe in a radio frame, D denotes the subframe is reserved for downlink transmissions, U denotes the subframe is reserved for uplink transmissions and S denotes a special subframe with the three fields DwPTS, GP and UpPTS. The length of DwPTS and UpPTS is given by Table 4 subject to the total length of DwPTS, GP and UpPTS being equal to $30720 \cdot T_s = 1$ ms. Each subframe i is defined as two slots, 2i and 2i+1 of length $T_{slot} = 15360 \cdot T_s = 0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. The UpPTS and the subframe immediately following the special subframe are always reserved for uplink transmission.

In case multiple cells are aggregated, the UE may assume the same uplink-downlink configuration across all the cells unless configured otherwise and that the guard period of the special subframe in the different cells have an overlap of at least $1456 \cdot Ts$.

TABLE 4

| Special subframe configuration | | Normal cyclic prefix in downlink | | | Extended cyclic prefix in downlink | | |
|---|---|---|---|---|---|---|---|
| | | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

TABLE 5

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As, in a new carrier, a special subframe may not have legacy PDCCH and starts PDSCH at first OFDM symbol, the number of OFDM symbols used in PDSCH in special subframe is increased to 11-14 from 8-11 in normal CP. When the number of OFDM symbols is equal to or greater than 12 which is the basis of TBS calculation in normal subframe in normal carrier, the scaling factor may be increased to 1.

In order to operate more efficient new carrier, a few mechanisms are possible as the followings. The present invention provides an option 1 of a uniform scaling factor for all special subframe configurations except for 0 and 5 in normal CP (or 0 and 4 in extended CP). When the starting index of PDSCH is 0, a scaling factor 1 instead of 0.75 regardless of configuration is used. The present invention provides an option 2 of increasing scaling factor for special subframe configuration 2, 3, 4 and 7, 8 from 0.75 to 1, and keeping the same rate to other configurations 1 and 6 when PDSCH starting position is 0. The present invention provides an option 3 that the scaling factor is 1, otherwise 0.75 can be used regardless of starting PDSCH starting position, generally, if the number of OFDM symbols used for PDSCH is greater than or equal to 12. This option 3 can be applied to normal subframe as well. In normal subframe, if OFDM symbols used for PDSCH are equal to 14, the scaling factor is 1.15.

Throughout all the options, in subframes without carrying TRS, additional 0.05 can be added to scaling factor determined based on PDSCH starting position and type of subframe of normal or special. Another consideration on special subframe configuration 9 (or 7 with extended CP) is to use 0.5 as a scaling factor as six OFDM symbols is 50% of 12 OFDM symbols considered in current TBS calculation when it is used in a new carrier and the starting index of PDSCH is 0.

Additionally, if scheduling of ePDCCH multiplexed with PDSCH is supported, it is assumed that data will be rate-matched around ePDCCH containing the DCI scheduling the PDSCH. With consideration of this case, there are two factors to be considered in determining TBS, (1) starting OFDM symbol for PDSCH (or ePDCCH) and (2) number of PRBs used for the scheduling DCI.

According to Rel-10 TBS table and depending on CIF, in the worst case, eNB should be able to handle about ~15-20% differences due to CIF (e.g., difference when CIF=1 and CIF=3 with larger than 6 RB system bandwidth), the eNB still can handle the dynamic situation changes up to 15%. Considering dynamic situation where both starting OFDM symbol can be changed and the number of PRBs used for ePDCCH change, one approach to determine TBS can be as follows. The present invention provides the following equation 4, here, $N''_{PRB}$ is set to the total number of allocated PRBs according to resource allocation, $$N'_{PRB} = \min\{\lfloor N''_{PRB} \times K_c \rfloor, N_{RB}^{DL}\}, \qquad \text{<Equation 4>}$$

if $$K_c = \left(|\text{Starting\_Symbol} - 3| \times \alpha - \frac{N_{rm}}{N''_{PRB}} \times \beta\right) \geq C_{thresh},$$

where α is a constant value such as 0.7 and β is a constant value (>=0.5) such as 1.0 and Starting_Symbol is the OFDM symbol index (e.g., 0, 1, 2, . . . ) for PDSCH starting position and $N_{rm}$ is the number of PRBs used for the associated ePDCCH overlapped with PDSCH and $C_{thresh}$ is a threshold value such as 0.15 or 0.2 or 0.25.

Or, the following equation 5 is set to the $N''_{PRB}$, $$N'_{PRB} = \min\{N''_{PRB} - N_{rm}, N_{RB}^{DL}\}, \qquad \text{<Equation 5>}$$

else if $$\frac{N_{rm}}{N''_{PRB}} \times \beta \geq C_{thresh}$$

set, where β is a constant value (>=0.5) and $N_{rm}$ is the number of PRBs used for the associated ePDCCH and $C_{thresh}$ is a threshold value such as 0.2 or 0.25.

Else, the following equation 6 is set to the $N''_{PRB}$.

$$N'_{PRB} = N''_{PRB} \qquad \text{<Equation 6>}$$

The present invention provides the total number of allocated PRBs according to resource allocation is set $N''_{PRB}$, if the transport block is transmitted in new carrier type subframe where PDSCH is transmitted starting OFDM symbol 0 and (tracking RS (CRS used for tracking) is not transmitted).

$$N'_{PRB} = \min\{\lfloor(N''_{PRB}-N_{rm})\times c\rfloor, N_{RB}^{DL}\} \qquad \text{<Equation 7>}$$

Where $N_{rm}$ is the number of PRBs used for the associated ePDCCH and c=1.25 (or c=1 or c=1.2 or c=1.3) in this case.

Else, the following equation 8 is set to the $N''_{PRB}$.

$$N'_{PRB} = \min\{N''_{PRB}-N_{rm}, N_{RB}^{DL}\} \qquad \text{<Equation 8>}$$

Where $N_{rm}$ is the number of PRBs used for the associated ePDCCH.

Also, the $N''_{PRB}$ may set to $N'_{PRB}=N''_{PRB}$ if the transport block is transmitted in new carrier type subframe where PDSCH is transmitted starting OFDM symbol 0 and (tracking RS (CRS used for tracking) is not transmitted), else $N'_{PRB}=\min\{N''_{PRB}-N_{rm}, N_{RB}^{DL}\}$ like the equation 8.

This invention also proposes the following equation 9

$$N'_{PRB} = \min\{N''_{PRB}-N_{rm}, N_{RB}^{DL}\}, \qquad \text{<Equation 9>}$$

If $$\frac{N_{rm}}{N''_{PRB}} \times \beta \geq C_{thresh},$$

where $\beta$ is a constant value (>=0.5) and $N_{rm}$ is the number of PRBs used for the associated ePDCCH overlapped with PDSCH and $C_{thresh}$ is a threshold value such as 0.2 or 0.25.

Else, the following equation 10 is set to the $N''_{PRB}$ $$N'_{PRB} = N''_{PRB} \qquad \text{<Equation 10>}$$

This invention also includes that an ePDCCH set refers to a set of PRBs configured to a UE to monitor ePDCCH to be applied with these equations.

Herein, the $N_{rm}$ used in the above equations can have the following options, 1) a number of PRBs used for the associated ePDCCH which overlap with the allocated PDSCH PRBs by the DCI, 2) a number of overlapped PRBs between the allocated PDSCH PRBs and PRBs used for an ePDCCH set which contains the scheduling DCI, 3) a number of overlapped PRBs between the allocated PDSCH PRBs and PRBs used for all ePDCCH sets if both ePDCCH sets are both localized or both distributed.

More specifically, when SPS PDSCH is transmitted, the size of TBS without scheduling DCI can be inferred from the most recent SPS PDSCH transmission. In this case, to allow flexible use of SPS PDSCH scheduling with ePDCCH, the present invention can be considered for USS ePDCCH as followings. This invention proposes that the SPS PDSCH is rate matched around PRBs configured to an ePDCCH set which is indicated by either validation/activation DCI or the ePDCCH set containing the validation/activation DCI or higher-layer signaled. More specifically, the condition can be further constrained to the case where ePDCCH set is a distributed ePDCCH set. It is called an Opt1 for this invention.

Also this invention proposes that the SPS PDSCH is rate matched around PRBs configured to the first ePDCCH set or the second ePDCCH set, Or the SPS PDSCH is rate matched around PRBs configured to any ePDCCH set if two sets are configured, rate matched around two sets. More specifically, the condition can be further constrained to the case where ePDCCH set is a distributed ePDCCH set. It is called an Opt2 for this invention.

Whereas, this invention also proposes that the SPS PDSCH is not rate matched around PRBs configured to an ePDCCH set. It is called an Opt3 for this invention.

The SPS PDSCH validation/activation DCI may contain the PRBs rate matched which will be assumed through SPS transmission. In other words, the SPS PDSCH is rate matched around PRBs in which the UE has detected the activation/validation DCI. It is called an Opt4 for this invention. The same PRBs rated matched in the most recent SPS PDSCH transmission with the same type of subframe (i.e., either ePDCCH monitoring subframe or PDCCH monitoring subframe) to the current subframe type (e.g., SPS PDSCH with a DCI via ePDCCH and rate matched in the overlapped PRBs) are assumed to be rate matched in the current SPS PDSCH. It is called an Opt5 for this invention.

For CSS ePDCCH for both PDSCH scheduled by a DCI or SPS PDSCH, this invention proposes that the PDSCH is rate matched around PRBs configured to ePDCCH set(s) assigned to CSS. Or, PDSCH is not rate matched around CSS ePDCCH set(s). The invention proposes that PDSCH is rate matched only when the UE detects DCI in CSS ePDCCH set(s) on PRBs where CSS DCI and PDSCH are overlapped.

Additionally, cases of the invention are considered where a UE is configured with one or more ePDCCH set, the ePDCCH set can be included as a distributed type.

(1) If activation/validation DCI is scheduled via PDCCH (i.e., in subframe where UE monitors PDCCH) and successive SPS PDSCH may come in subframe configured to monitor ePDCCH, there are the Opt1, Opt2 and Opt3 are applicable per subframe basis. In other words, when SPS PDSCH comes in ePDCCH monitoring subframe, the assumption captured in each option is applied in the subframe. Or a UE is configured with ePDCCH set, regardless of where activation DCI is transmitted whether in PDCCH monitoring subframe or ePDCCH monitoring subframe, the Opt1, Opt2 and Opt3 may be applied. For example, if Opt2 is used with rate matching around the first ePDCCH set, regardless of subframe type, the same PRBs will be assumed to be rate matched.

Whereas, if Opt4 is used, rate match in subframe configured to monitor ePDCCH for SPS PDSCH is not performed. If Opt5 is used, a rate matching in subframe configured to monitor ePDCCH for SPS PDSCH is not performed.

(2) If activation/validation DCI is scheduled via ePDCCH (i.e., in subframe where UE monitors ePDCCH) and successive SPS PDSCH may come in subframe configured to monitor PDCCH, for all options, SPS PDSCH rate matching (if applicable) is considered in ePDCCH monitoring subframes. However, SPS PDSCH rate matching around ePDCCH region in PDCCH monitoring subframe is not assumed. In other words, regardless of rate matching at ePDCCH monitoring subframes, rate matching in PDCCH monitoring around ePDCCH sets is not assumed. Or, the same PRB set is assumed to be rate matched per each option regardless of ePDCCH or PDCCH monitoring subframe. In other words, rate matched PRB set follows the rate matching pattern determined by activation/validation DCI scheduled PDSCH.

(3) Both activation and successive PDSCH are transmitted in ePDCCH monitoring subframes, for all options are applied in successive SPS PDSCH transmissions.

(4) Both activation and successive PDSCHs are transmitted in PDCCH monitoring subframes, if Opt1 or Opt2/2a is assumed, in PDCCH monitoring subframes, the same assumption is applied. In other words, rate matching is performed around ePDCCH sets even in PDCCH monitoring subframes. Or, rate matching on Opt1 or Opt2 is applicable only in ePDCCH monitoring subframes.

If Opt4 or Opt5 is used, rate matching is not assumed.

As described, if rate matching is applied, the invention may assume that rate matching is applied regardless of PDCCH or ePDCCH monitoring subframe, and rate matching is applied per subframe basis i.e., applicable only to ePDCCH monitoring subframe.

In this invention, when Opt5 is used, it can be assumed that UE shall not assume rate matching around ePDCCH in PDCCH monitoring subframe and UE shall assume rate matching around ePDCCH in ePDCCH monitoring subframe. Thus, rate matching pattern in ePDCCH monitoring subframe follows the most recent SPS PDSCH transmitted in ePDCCH subframe.

Furthermore, rate matching can be configured per subframe by higher layer such that if a subframe is configured to perform rate matching around ePDCCH set, all PDSCH (scheduled by DCI or SPS) are rate matched around configured ePDCCHs.

Additionally, SPS is configured when a UE configured to TM10, UE assumes that rate matching on SPS PDSCH is not performed regardless of subframe type and activation/validation DCI via ePDCCH or PDCCH. Initial PDSCH scheduled by DCI would not be rate matched as well. Or, options listed above can be applied in TM10 regardless of subframe types whether ePDCCH or PDCCH monitoring subframe. For example, if rate matching is applied, it occurs in all subframes where SPS PDSCHs are transmitted. Or, options listed above can be applied per subframe type (according to configuration per serving cell) as described in above.

In relation to PDSCH rate matching around scheduling DCI via ePDCCH if a UE is configured with TM10 or a new TM (say new_TM) supporting CoMP operation or small cell efficient operation is next described. When a PDSCH is scheduled by ePDCCH in TM10 or a new TM, in terms of rate matching around the ePDCCH which schedules the PDSCH or generally rate matching around ePDCCH may have following options:

(1) PDSCH rate matching around its scheduling DCI, similar to TM1-9, PDSCH rate matching occurs around scheduling DCI.

(2) PDSCH rate matching is not assumed if scheduling DCI and PDSCH are transmitted from the different transmission points or cells. Another alternative is to assume that PDSCH is not rate matched around scheduling DCI if transmission points of control and data are different. Otherwise, UE shall assume PDSCH is rate matched around its scheduling DCI. Multiple approaches are to determine whether they come from the same TP or not.

A. Based on PQI (PDSCH RE mapping and Qausi-co-located Indicator) index associated with ePDCCH set where the DCI is transmitted and PQI associated with PDSCH which is either indicated by PQI field in DCI format 2D or RRC configured PQI for DCI format 1A, if ePDCCH sets and PDSCH share the same set of PQI tables and if PQI index is different, UE shall assume two are transmitted from different transmission points. Otherwise, UE assumes two are sent by the same TP.

B. Based on linked CRS or discovery signal in each PQI, if each CSI-RS is assigned with a linked QCL-ed CRS or discovery signal information including cell ID, etc and if two PQIs are different for ePDCCH set and PDSCH and linked CRS or discovery Cell IDs are different, UE shall assume two are transmitted from different transmission points. Otherwise, UE assumes that PDSCH is rate matched around its scheduling DCI.

(3) PDSCH rate matching around its scheduling DCI is not assumed always regardless of transmission points in TM10 or a new TM. More specifically this condition may be further limited to a case where inter-site CoMP is configured when a UE knows that at least one configured TP is not co-sited with the serving cell.

(4) Higher layer indication of rate matching, the approach is to introduce a higher-layer signaling to decide the necessity of rate matching around its scheduling DCI, i.e., indication of UE assumption on rate matching around its scheduling DCI.

(5) Higher layer signaling of a set of rate matching PRBs per each PQI index, the approach is that UE shall assume PDSCH is rate matched around a set of PRBs indicated by higher layer associated with PQI. If the set is not configured, UE assumes the default behavior that PDSCH is rate matched around its scheduling DCI. If the set is given, regardless of the presence of ePDCCH in configured PRBs, UE assumes that PDSCH is rate matched around the configured PRBs.

(6) Following linked PQIs for rate matching, the approach is that a UE can be configured with a set of linked pair of PQIs for the rate matching. For example, a UE is configured with {0, 1} and {0, 2} but no {0, 3} for PQI index 0 for PDSCH, UE assumes that if the linked PQI of the scheduling ePDCCH set is either 1 or 2, it assumes rate matching around its scheduling DCI. Otherwise, no rate matching is assumed. Or, a UE assumes a default behavior of rate matching and higher layer can configure the set of exceptions i.e., no rate matching pairs as well. Higher layer configuration can be further generalized such that a UE is configured with either 4×4 matrix where (i,j)=1 implies rate matching applies or UE is configured with two sets: {PDSCH PQIs, ePDCCH set PQIs} where any combination from the configuration is assumed for rate matching (either rate matching or not). UE can be configured with multiples of these configurations.

(7) Following the indication of rate matching around its scheduling DCI as indicated by PQI, either in DCI 2D field or RRC configured PQI index for DCI 1A, the approach is to have a field in PQI entry in PQI table for rate matching indicator. When this field is set to 1, it means rate matching is assumed around its scheduling DCI, otherwise rate matching is not assumed.

Even though a new carrier may not have legacy PDCCH area, due to neighbor legacy cells, PDSCH starting first OFDM symbol for a UE may not be able to transmit in the new carrier. Depending on the location of a UE and interference situation on the UE, each UE may be able to successfully receive PDSCH starting first OFDM symbol or it may experience collision in PDCCH area due to high interference from a legacy carrier.

Another issue to handle with SPS PDSCH is to address different rate matching depending on whether the subframe may carry CRS/PDCCH and/or TRS. Depending on subframe type and configuration, PDSCH without DCI may be scheduled in a subframe with CRS transmission in one time and scheduled in a subframe without CRS transmission in a different subframe. The starting OFDM symbol index can be also changed. Thus, different rate matching can be assumed for each PDSCH without DCI and the rate matching will be based on configuration of CRS or TRS.

Figure 9:
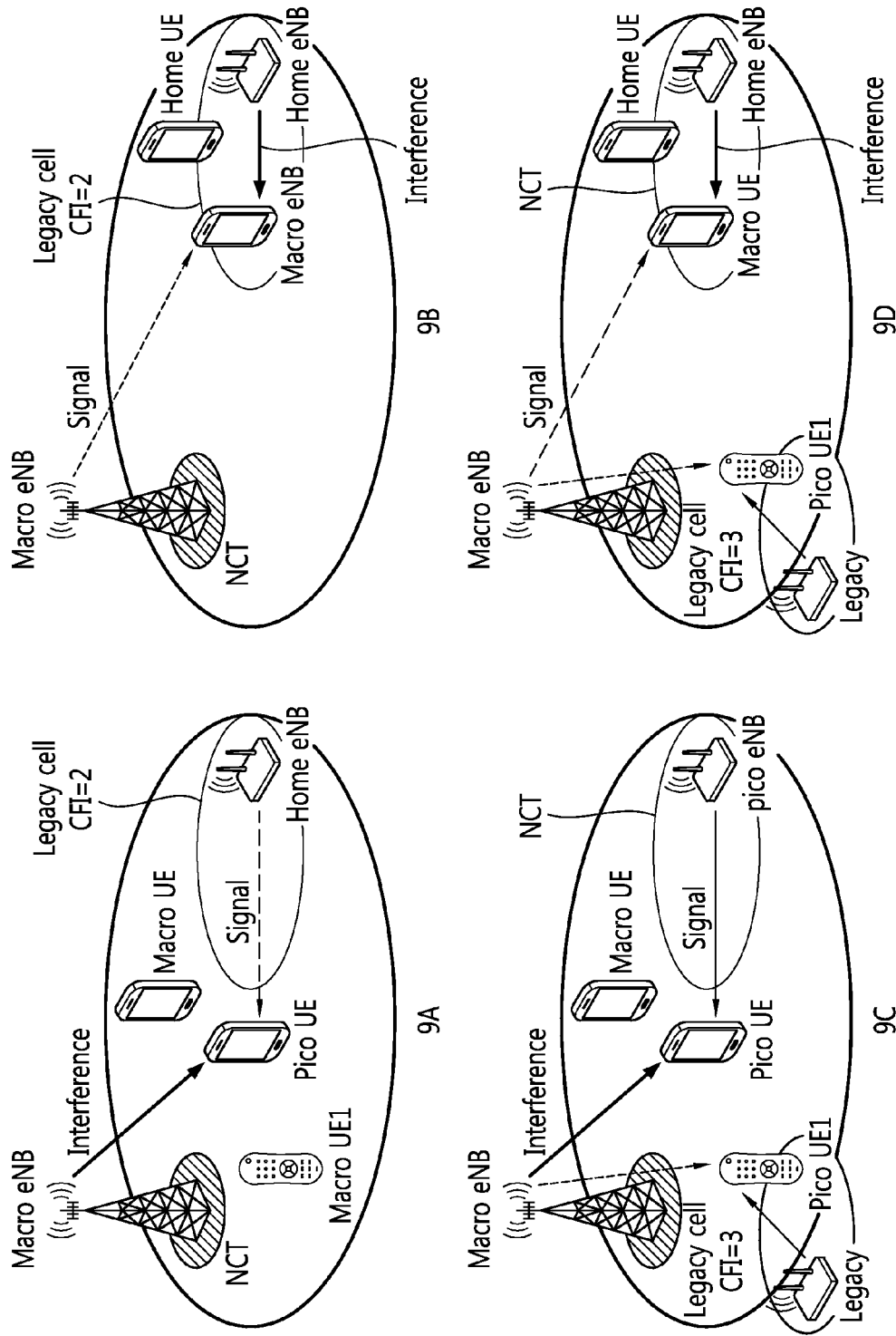
FIG. 9A-9D illustrate scenarios of configuring ABS (almost blank subframe) in HetNet environment.

FIG. 9 illustrates scenarios of configuring ABS (almost blank subframe) in HetNet environment to which the present invention is applied.

Referring to FIG. 9(a), when aggressor cell type is a new carrier (NC), instead of configuring ABS in the aggressor cell, the NC aggressor cell can configure the starting position of PDSCH to be OFDM symbol 3 (i.e., 4th OFDM symbol) so that it does not interfere with PDCCH region of victim a pico cell. The PDSCH scheduled for UEs which may not interfere with victim cell such as Macro UE may start from OFDM symbol 0 as it may not interfere with victim cell's PDCCH region. PDSCHs of two cells can be FDM to avoid heavy interference each other. Thus, the starting position of PDSCH in NCT is UE-specific depending on the potential interference. The mechanism to detect whether it has interfering neighbor legacy cells or not will be based on neighbor cell measurement reports from each UE. The macro UE1 will report interference from Pico cell to Macro eNB which will be used to determine a right PDSCH starting position for macro UE1.

Referring to FIG. 9(b), when a CSG (closed subscriber group) and a NC macro cell coexist, the CSG may have to configure ABS to support the macro UE served by a NC macro cell. Of course, the NC cell may configure the starting position of PDSCH to macro UE to be OFDM symbol 3 (i.e., 4th OFDM symbol assuming PDCCH region of CSG is three OFDM symbols) all the time. To the performance of the macro NC cell and thus it is desirable to configure ABS in CSG so that the macro NC can maximize the system capacity. For the Macro UE, depending on ABS configuration of CSG, the starting position of PDSCH can vary from 1 to 4.

Referring to FIG. 9(c), this case illustrates that one legacy macro cell may have multiple pico neighbor cells where some pico cells' type is NC and some are NC carriers. In this case, legacy cell may configure ABS for Pico UEs served by legacy pico cell. When the legacy macro cell configures ABS, NC can utilize to maximize the throughput as well. Thus, the starting position of PDSCH in NC pico cell may vary depending on macro cell ABS configuration.

Referring to FIG. 9(d), when CSG is an aggressor cell with NCT, it can configure the starting position of PDSCH to be OFDM symbol 3 (i.e., 4th OFDM symbol) so that it does not interfere with legacy cell PDCCH region. When legacy macro cell is configured with ABS (for example, to handle ICIC with other neighbor pico cell similarly as shown in case (c)), the starting position of PDSCH in CSG NCT can be set to 1 as well.

As demonstrated in the examples, there will be cases where the starting position of PDSCH in UE served by NCT vary subframe-to-subframe. One example is ABS configuration of neighbor cell as shown in the examples. Another case may include CoMP scenarios. To handle varying PDSCH starting position of a UE in NC carrier, the invention provides following options including 1) set and 2) dynamic notification schemes.

Firstly, this invention includes configuring two or multiple sets and assigning a PDSCH starting position per each set respectively. The sets may be disjoint. Or, the sets may be overlapped i.e., a subframe may belong to multiple sets e.g., due to different ICIC configurations for multiple neighbor cells. When a subframe belongs to multiple sets with different values of PDSCH starting position configured, the starting position of PDSCH for that subframe would be the largest values among all PDSCH values configured for the sets which include the subframe.

The sets can be configured by {starting radio frame, subframe offset, periodicity} or bitmap. For example, set 1 starts the PDSCH at OFDM symbol 0 and the bitmap will be ABS configuration of a neighbor cell. The size of bitmap in FDD case would be 40. And set 2 starts the PDSCH at OFDM symbol 3 and the bitmap would be complementary of set 1. The sets will be configured via RRC signaling.

Secondly, this invention includes a dynamic notification to indicate the starting position of PDSCH in scheduling DCI. This allows dynamic change of PDSCH starting position per subframe. One example is to add a field PDCCH Starting Position in DCI format to schedule PDSCH to indicate the starting OFDM symbol index for the scheduled PDSCH. Another example is to use some fields such as TPC to use as PDCCH starting position field assuming such field is not used. Another example is to use CRC attachment similar to UE transmit antenna selection scheme. In the case where the starting position of PDSCH is OFDM symbol 0, it can use the first mask as in below and when the starting position of PDSCH is OFDM symbol 3, it can use the second mask as in below.

When this dynamic notification is used, the CRC parity bits of PDCCH with DCI format 1A, 2B or 2C (for TM8 or TM9) are scrambled with the antenna selection mask $x_{AS,0}$, $x_{AS,1}$, ..., $x_{AS,15}$ as indicated in Table 6 and the corresponding RNTI $x_{rnti,0}$, $x_{rnti,1}$, ..., $x_{rnti,15}$ to form the sequence of bits $c_0, c_1, c_2, c_3, \ldots, c_{B-1}$. The relation between $c_k$ and $b_k$ is following equation 11.

$$c_k = b_k \text{ for } k=0,1,2,\ldots,A-1$$

$$c_k = (b_k + x_{rnti,k-A} + x_{AS,k-A}) \bmod 2 \text{ for } k=A, A+1, A+2, \ldots, A+15 \quad \text{<Equation 11>}$$

The Table 6 shows PDSCH Starting Position selection mask. The TBS can be calculated based on the starting position of PDSCH and the existence of CRS in the subframe.

TABLE 6

| UE transmit antenna selection | Antenna selection mask <$x_{AS,0}, x_{AS,1}, \ldots x_{AS,15}$> |
|---|---|
| PDSCH starting 0 | <0, 0, 0, 0, 0, 0, 0, 0, 0, 0, 0, 0, 0, 0, 0, 0> |
| PDSCH starting 3 | <0, 0, 0, 0, 0, 0, 0, 0, 0, 0, 0, 0, 0, 0, 0, 1> |

Since a new carrier may not carry enough Cell-specific RS for channel estimation and data demodulation, it is recommended to supports transmission modes working with user-specific RS for channel estimation and data demodulation. This may include transmission mode 7, 8 and 9 defined in Release-10 LTE specification. As transmission mode 7 will be covered by transmission mode 8 and 9, for the simplicity, one can assume that the new carrier supports only transmission mode 8 and 9 only. In Release-10 LTE specification, transmission mode 8 and 9 specifies DCI format 1A for a fall-back case which works based on CRS channel estimation and data demodulation. Only MBSFN subframe in TM9 supports DM-RS based data demodulation for DCI format 1A. Further TM10 and new_TM can be considered for new carrier type as well.

This invention, thus, proposes to introduce fallback of TM 8 and 9 to single antenna port 7 DM-RS based DCI format 1A. This invention proposes to set transmission mode 9 as a default TM for SCell where fall-back mode of any transmission supported in a new carrier is transmission mode 9. In other words, when either the transmission mode is not configured or being reconfigured, a UE assumes that transmission mode is 9 in a new carrier Scell with single antenna port 7. In the default TM fall-back mode, single antenna port 7 is assumed with using DCI format 1A. In this case, the following Table 7 shows transmission mode of PDCCH and PDSCH configured by C-RNTI, it may be required in LTE release-10 specification.

TABLE 7

| Transmission mode | DCI format | Search Space | Tranmission scheme of PDSCH corresponding to PDCCH |
|---|---|---|---|
| Mode 1 | DCI format 1A | Common andUE specific by C-RNTI | Single-antenna port, port 0 (see subclause 7.1.1) |
|  | DCI format I | UE specific by C-RNTI | Single-antenna port, port 0 (see subclause 7.1.1) |
| Mode 2 | DCI format 1A | Common andUE specific by C-RNTI | Transmit diversity (see subclause 7.1.2) |
|  | DCI format I | UE specific by C-RNTI | Transmit diversity (see subclause 7.1.2) |
| Mode 3 | DCI format 1A | Common andUE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common andUE specific by C-RNTI | Transmit diversity (see subclause 7.1.2) |
|  | DCI format 2 | UE specific by C-RNTI | Closed-loop spatial multiplexing (see subclause 7.1.4)or Transmit diversity (see subclause 7.1.2) |
| Mode 5 | DCI format 1A | Common andUE specific by C-RNTI | Transmit diversity (see subclause 7.1.2) |
|  | DCI format 1D | UE specific by C-RNTI | Multi-user MIMO (see subclause 7.1.5) |
| Mode 6 | DCI format 1A | Common andUE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common andUE specific by C-RNTI | If the number of PBCH antenna ports is one, Single-antenna port, port 0 is used (see subclause 7.1.1), otherwise Transmit diversity (see subclause 7.1.2) |
|  | DCI format I | UE specific by C-RNTI | Single-antenna port, port 5 (see subclause 7.1.1) |
| Mode 8 | DCI format 1A | Common andUE specific by C-RNTI | In new carrier type: single-antenna port, port 7 (see subclause 7.1.1) If the number of PBCH antenna ports is one, Single-antenna port, port 0 is used (see subclause 7.1.1), otherwise Transmit diversity (see subclause 7.1.2) |
|  | DCI format 2B | UE specific by C-RNTI | Dual layer transmission, port 7 and 8 (see subclause 7.1.5A) or single-antenna port, port 7 or 8 (see subclause 7.1.1) |
| Mode 9 | DCI format 1A | Common andUE specific by C-RNTI | In new carrier type: single-antenna port, port 7 (see subclause 7.1.1) Non-MBSFN subframe: If the number of PBCH antenna ports is one, Single-antenna port, port 0 is used (see subclause 7.1.1), otherwise Transmit diversity (see subclause 7.1.2)MBSFN subframe: Single-antenna port, port 7 (see subclause 7.1.1) |
|  | DCI format 2C | UE specific by C-RNTI | Up to 8 layer transmission, ports 7-14 (see subclause 7.1.5B) |
| Mode 10 | DCI format 1A | Common andUE specific by C-RNTI | In new carrier type: single-antenna port, port 7 (see subclause 7.1.1) Non-MBSFN subframe: If the number of PBCH antenna ports is one, Single-antenna port, port 0 is used (see subclause 7.1.1), otherwise Transmit diversity (see subclause 7.1.2)MBSFN |

TABLE 7-continued

| Transmission mode | DCI format | Search Space | Tranmission scheme of PDSCH corresponding to PDCCH |
|---|---|---|---|
| | | | subframe: Single-antenna port, port 7 (see subclause 7.1.1) |
| | DCI format 2C/2D | UE specific by C-RNTI | Up to 8 layer transmission, ports 7-14 (see subclause 7.1.5B) |

This invention also applies to a new transmission mode 10 specified for CoMP operation. In release-10 LTE specification, TM 8/9 is supported through CRS-based CSI (channel state information) feedback from a UE which needs some modification to be used in NCT where CRS for channel estimation is not transmitted.

One approach to address this issue is to use CSI-RS for CSI feedback for TM 8 as well similar to TM 9. Another approach is to transmit CRS port 1 (assuming CRS port 0 is transmitted for tracking RS purpose) additionally so that CRS feedback becomes feasible.

Another approach is to define a new TM (e.g., TM11) which is a variation of TM9 with including supporting IMR supported in TM10. The new mode can be called as TM9 in NCT as well which is slightly different from the existing TM9 or TM10 as the following.

TM11 (or TM9 in NCT) supports interference measurement resource (IMR) where the number of CSI process is one. In other words, it does not support DPS. DCI formats that UE shall support are the same as to TM9 (i.e., DCI 1A/2C for downlink). UE performs rate matching for SPS PDSCH and PDSCH on the configured ePDCCH sets or per configured rate matching pattern. Or alternatively, SPS PDSCH and data rate matching may follow either TM9 or TM10 decisions. TM11 (or TM9 in NCT) supports all UE processing related to IMR. Quasi-collocated (QCL) assumptions between TRS and DM-RS/CSI-RS cannot be assumed. Or higher-layer configuration can be given to indicate whether TRS and DM-RS/CSI-RS is QCL or not. This higher-layer signaling can be given per each ePDCCH set for each UE (i.e., up to two signals for USS ePDCCH and one signal for CSS are possible). If higher-layer signaling is given separately to indicate QCL between DM-RS and CSI-RS resource for PDSCH, it may be assumed. Either QCL follows the QCL configuration for first (or second) USS ePDCCH set or CSS ePDCCH set. Or, it may be assumed that TRS and DM-RS and CSI-RS are QCL. If higher-layer signaling is given separately to indicate QCL between DM-RS and CSI-RS resource for ePDCCH, it may be assumed. Either it may be assumed that TRS and DM-RS and CSI-RS are QCL. Or, it may be assumed that DM-RS and CSI-RS are QCL.

Higher layer signaling may indicate DM-RS and TRS or discovery signal are QCL for an ePDCCH set while the other ePDCCH is QCL between DM-RS and CSI-RS where a UE can be configured to monitor a subset of subframes for each ePDCCH set respectively. For example, by default, UE assumes that UE will monitor the first USS ePDCCH set and CSS ePDCCH set. If a bitmap is configured to indicate a subset of subframes for the second USS ePDCCH set, it will monitor second ePDCCH in those subframes not the first ePDCCH set. CSI feedback mode (pmi-ri-off) can be configured per each CSI subset differently as QCL assumption might be different. Or if PMI-RI is configured where the referenced valid downlink subframe is a subframe to monitor the second set which is QCL configured between TRS/DM-RS/CSI-RS, CSI feedback will be based on TRS. Or, it can simply be assumed that TRS/DM-RS/CSI-RS are QCL.

Furthermore, QCL indication can be different within a CSI resource. Thus, QCL indication can be done by a mapping between DM-RS port and CSI-RS port within a CSI resource.

In a new carrier, there is no need to have a consistent CP length over the entire subcarriers especially new carrier is used as a TP in a CoMP scenario. Also, a new carrier may be shared by multiple CoMP sets where different CoMP set may use different CP length. Thus, it is desirable to allow flexible configuration of CP length in NCT. More specifically, as no cell-specific signaling is used other than TRS and CSI-RS in NCT, CP length may be configured per UE via higher layer signaling or dynamic indication via DCI.

For cell-specific TRS, UE may assume that the same CP length is used which is detected by PSS/SSS or discovery signal. When PSS/SSS are absent, unless higher layer signaling is indicated otherwise, UE assumes that normal CP is used for TRS. For cell-specific CSI-RS, either UE may assume that the same CP length is used if TM1-9 is configured to a UE or UE may assume that the same CP length configured for PDSCH CP length (UE-specific CP length) if TM10 or new_TM is configured to a UE (i.e., a UE supports CoMP operation) for CSI-RS resources which are indicated to be Quasi-collocated to DM-RS for that carrier. If multiple CSI-RS resources are configured for multiple TPs which may have different CP lengths. In this case, CSI-RS and DM-Rs indicated to be quasi-collocated will share the same CP length. If PMCH is carried, UE shall assume extended CP is used in PMCH.

For ePDCCH CSS, UE shall assume the same CP length is used which is derived from PSS/SSS or a discovery signal. UE may assume that ePDCCH CSS is not present if PSS/SSS or a discovery signal is not detected or configured not to be present. If UE is configured to monitor ePDCCH CSS and/or TRS but is not able to decode PSS/SSS or a discovery channel for a non-serving cell, it may assume the same CP length as to the serving cell. For ePDCCH USS, UE shall assume the same CP length is used for PDSCH if TM1-9 is configured or UE shall assume the same CP length as to the serving cell's PDSCH CP length or cell-specific CP length if TM10 is configured. Moreover, UE may be configured with CP length for (1) commonly used for ePDCCH CSS and USS (2) separate CP lengths for ePDCCH CSS and USS respectively (3) separate CP length for ePDCCH CSS, USS and PDSCH respectively. For case (1) and (2), UE assumes that PDSCH CP length follows ePDCCH CP length. When a UE is configured with UE-specific CP-length, the same CP-length is used for uplink transmission channels (e.g., PUCCH and PUSCH and SRS) as well. For RACH/msg 3 (either initial or initiated by PDCCH order) uses the cell-specific CP-length.

Furthermore, dynamic signaling of CP length for PDSCH or PUSCH is feasible such that downlink scheduling DCI or uplink grant DCI contains a field indicating the CP length of scheduled/granted data channel. For SPS PDSCH or PUSCH, initial configuration can include the CP length used for SPS transmissions.

In addition to, PDSCH Data Rate Matching in CoMP operation including a new carrier in this invention is provided. For data rate matching and decoding purpose in CoMP DPS operation, it would be desirable to signal CP length used if transmitting point uses different CP length. If the value is not signalled or not present, UE assumes that the same CP length to the serving cell is used for PDSCH.

A presence of PSS/SSS and/or PBCH may be configured, for example, if a new carrier is used only for a TP not as a serving cell, it would be desirable not to transmit PSS/SSS and/or PBCH to improve the data throughput), it is worthwhile to indicate the presence of PSS/SSS and/or PBCH at least for subframe #0 and/or #5 where legacy carrier carries PSS/SSS. Or, if the cell type is known to the UE, the indication of cell ID or cell type may be sufficient in the indication. In this case, additional higher layer signaling to inform a UE about cell-specific configurations (such as the presence of PSS/SSS) can be informed.

As a new carrier may carry a TRS (tracking RS) not in every subframe, either indication of the presence of TRS may be given. Then the UE may assume a set of subframe (e.g., #0, #5 or a set which is configured by higher layer configuration) carrying a TRS or a new measurement RS even though CRS antenna port number is zero. If TRS is carried over a sub-band rather than a whole system bandwidth, and PDSCH is scheduled over RBs where is a subset of RBs carrying the TRS and the other RBs do not carry TRS. The UE may assume either TRS is used for all RBs or if the UE is informed that the TP is in a new carrier so that the UE may assume that TRS is not used for all RBs. When a UE assumes that TRS is not used for TRS subframe of new carrier, eNB may not utilize TRS subframe for DPS or if TRS subframe is used for DPS, the TRS may be inserted by puncturing PDSCH RE where UE may have degraded data decoding performance.

For instance, default CSS ePDCCH may consume some of RBs allocated for PDSCH when a PDSCH is transmitted by non-serving cell. In this case, either a default CSS ePDCCH resource is indicated or a set of rate matched RBs can be indicated to the UE where UE shall assume rate matched RBs. If it is not indicated, UE assumes that either no rate matched RBs are present or the same default ePDCCH CSS resource is used as to the serving cell if serving cell uses ePDCCH CSS as well. Unless noted otherwise, UE shall not assume default ePDCCH CSS carries DCIs (i.e., UE shall not assume rate matching around ePDCCH CSS set).

This invention also describes an example of CSI-RS transmission in new carrier. In a new carrier, a UE may expect to receive CSI-RS since non-zero-power CSI-RS is configured. The UE may be configured by higher-layer signaled of either assuming all CSI-RS (once configured) or following Rel-10 rule i.e., no CSI-RS in sync signals, PBCH, SIB1, paging, special subframe. Exceptionally, the UE may assume that CSI-RS will not be transmitted in special subframe, at least special subframe configuration 0, 5 in normal CP and 0, 4 in extended CP. When a UE is configured with Rel-11 IMR (Interference Measurement Resource), a UE may assume that IMR measurement would not be occurred in PRBs where synchronization signals or PBCH are present. Additionally, UE may assume that IMP measurement would not be occurred in paging subframes.

Assuming transmission modes based on TM9 (or TM 8) or TM10 is used for new carrier type, the issue of CSI feedback with the absence of CRS may be addressed via a few following approaches.

Option 1: Use tracking RS for CSI measurement: when pmi-ri-report is off, the default behavior of a UE is to use tracking RS for obtaining CSI information assuming single port transmission (7 or 0). The channel on antenna port {0} or {7} are inferred from the channel on antenna port of the associated tracking RS (e.g, tracking RS antenna port of {1100}). If the number of antenna ports of the associated CSI-RS resource is 2, the PDSCH transmission scheme assumes the transmit diversity scheme on antenna ports {0, 1} except that the channels on antenna ports {0, 1} are inferred from the channels on antenna port of the associated tracking RS (e.g. tracking RS antenna port {1100, 1101}).

Option 2: Ignore pmi-ri-report=off mode so that an UE assumes that the same CSI reporting behavior is expected with pmi-ri-report is configured as on mode. In other words, pmi-ri-report off mode is not used. In this case, UE may assume there is only one CSI-RS port is configured, i.e., antenna port 15. As the number of CSI-RS antenna port is one, UE shall not perform any rank-related reporting and will transmit no PMI when periodic CSI report is made. For aperiodic CSI request, UE shall assume no PMI report as well and perform CSI reporting function as in pmi-ri-report is not configured. The main difference is to use CSI-RS (single port) instead of CRS/TRS.

Option 3: Treat tracking RS as antenna port 0 CRS and perform CSI measurement. Thus, single antenna port 0 transmission is assumed. In this case, eNB may transmit more CRS with antenna port 1 for better measurement accuracy.

Option 4: Use CSI-RS for CSI-RS measurement. Instead of using CRS, the UE uses CSI-RS for measurement. In this case, UE may assume there is only one CSI-RS port is configured (i.e., antenna port 15). As the number of CSI-RS antenna port is one, UE shall not perform any rank-related reporting and will transmit no PMI when periodic CSI report is made. For aperiodic CSI request, UE shall assume no PMI report as well.

Option 5: follow CoMP decision as below.

For transmission mode 9 CSI reporting in a new carrier, assume zero CRS or TRS RE, i.e., assume no TRS is transmitted. If the UE is configured for PMI/RI reporting, the UE-specific reference signal overhead is consistent with the most recent reported rank; and PDSCH signals on antenna ports $\{7, \ldots, 6+v\}$ for v layers would result in signals equivalent to corresponding symbols transmitted on antenna ports $\{15, \ldots, 4+v\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where
$x(i)=[x^{(v)}(i) \ldots x^{(v-1)}(i)]^T$ is a vector of symbols from the layer mapping, $p \in \{1, 2, 4, 8\}$ is the number of CSI-RS ports configured, and if only one CSI-RS port is configured, W(i) is 1 and the UE-specific reference signal overhead is 12REs. If more than one CSI-RS ports are configured, otherwise W(i) is the precoding matrix corresponding to the reported PMI applicable to x(i). The corresponding PDSCH signals transmitted on antenna ports {15, . . . , 4+p} would have a ratio of EPRE to CSI-RS EPRE equal to the ratio given.

For transmission mode 9/10 CSI reporting, if a CSI process is configured without PMI/RI reporting. If the number of antenna ports of the associated CSI-RS resource is one, a PDSCH transmission is on single-antenna port, port 7. The channel on antenna port {7} is inferred from the channel on antenna port {15} of the associated CSI-RS resource. Assume zero CRS or TRS RE (i.e., assume no TRS is transmitted), the UE-specific reference signal overhead is 12 REs per PRB pair. Otherwise, if the number of antenna ports of the associated CSI-RS resource is 2, the PDSCH transmission scheme assumes the transmit diversity scheme defined on antenna ports {0, 1} except that the channels on antenna ports {0, 1} are inferred from the channels on antenna port {15, 16} of the associated CSI resource respectively. If the number of antenna ports of the associated CSI-RS resource is 4, the PDSCH transmission scheme assumes the transmit diversity scheme on antenna ports {0, 1, 2, 3} except that the channels on antenna ports {0, 1, 2, 3} are inferred from the channels on antenna ports {15, 16, 17, 18} of the associated CSI-RS resource respectively. The UE is not expected to be configured with more than 4 antenna ports for the CSI-RS resource associated with the CSI process configured without PMI/RI reporting. The overhead of CRS REs is assuming the same number of antenna ports as that of the associated CSI-RS resource.

In addition to, assume zero CRS or TRS RE (i.e., assume no TRS is transmitted), the UE specific reference signal overhead is 24Res. Alternatively, if TX diversity is defined for port {7, 8, 9, 10} using DM-RS, antenna port 0 is changed to 7, port 1 to port 8, port 2 to port 9 and port 3 to port 10 respectively as a new carrier may not define port 0-3.

For transmission mode 10 CSI reporting, if a CSI process is configured with PMI/RI reporting, TRS REs are as in non-MBSFN subframes, assume zero CRS or TRS RE (i.e., assume no TRS is transmitted). The UE-specific reference signal overhead is consistent with the most recent reported rank and PDSCH signals on antenna ports {7, . . . , 6+v} for v layers would result in signals equivalent to corresponding symbols transmitted on antenna ports {15, . . . , 14+v}, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i)=[x^{(v)}(i) \ldots x^{(v-1)}(i)]^T$ is a vector of symbols from the layer mapping, $p \in \{1, 2, 4, 8\}$ is the number of antenna ports of the associated CSI-RS resource, and if P=1, W(i) is 1 and the UE-specific reference signal overhead is 12Res. If P>1, W(i) is the precoding matrix corresponding to the reported PMI applicable to x(i). The corresponding PDSCH signals transmitted on antenna ports {15, . . . , 14+v} would have a ratio of EPRE to CSI-RS EPRE equal to the ratio given.

In case Option 1 or Option 3 is used, there may be no TRS transmitted at the valid subframe according to the current LTE system as tracking RS will be transmitted with 5 msec periodicity. Thus, the definition of valid subframe may be changed to the following:

A downlink subframe in a serving cell shall be considered to be valid case if it is configured as a downlink subframe for that UE, if it transmits tracking RS or CRS when pmi-ri-report is not configured and tracking RS is used for CQI calculation, if it is not an MBSFN subframe except for transmission mode 9, if it does not contain a DwPTS field in case the length of DwPTS is $7680 \cdot T_s$ and less, if it does not fall within a configured measurement gap for that UE, or if it is an element of the CSI subframe set linked to the periodic CSI report when that UE is configured with CSI subframe sets for periodic CSI reporting.

If there is no valid downlink subframe for the CSI reference resource in a serving cell, CSI reporting is omitted for the serving cell in uplink subframe n.

In case Option 1 to Option 5 is used, the transmission mode of PDSCH for CSI reference resource may be assumed as following Table 8 or Table 9. More, the Table 8 shows when Option 1, 3, or 5 is used, and the Table 9 shows when Option 2 or 4 is used.

TABLE 8

| Transmission mode | Transmission scheme of PDSCH |
| --- | --- |
| 9/10 (or new TM for NCT/CoMP) | If the UE is configured without PMI/RI reporting: take one assumption among the following choices:<br>(1) antenna ports is one, single-antenna port, port 7 (when option 1/3/5 is used)<br>(2) antenna port is same as the antenna port of TRS (when option 1 is used)<br>(3) antenna port is one, single-antenna port, port 0 (when option 3 is used)<br>Otherwise, transmit diversity<br>Closed-loop spatial multiplexing with up to 8 layer transmission, ports 7-14 (see subclause 7.1.5B) |

TABLE 9

| Transmission mode | Transmission scheme of PDSCH |
| --- | --- |
| 9/10 (or new TM for NCT/CoMP) | If the UE is configured without PMI/RI reporting: take one assumption among the following choices:<br>(1) if rank = 1, antenna port is one, single antenna port 7<br>(2) if rank >1, same as PMI/RI reporting is configured (when option 2 is used)<br>(3) if rank >1, antenna port is one, single antenna port 7 (when option 4 is used)<br>Closed-loop spatial multiplexing with up to 8 layer transmission, ports 7-14 (see subclause 7.1.5B) |

Furthermore, in Release-10 LTE specification, UE may assume the followings for deriving CQI and, PMI and RI (if configured). This invention proposes to add no REs allocated to CRS as only one subframe among five subframes. Carrying CRS and CSI feedback will be performed based on CSI-RS rather than CRS or TRS. Moreover, as a new carrier may not carry PDCCH even though it may carry ePDCCH, the assumption on control region can be modified to assume no REs allocated to control signaling. Also, the new carrier may not carry PBCH.

In the CSI reference resource, the UE shall assume the following for the purpose of deriving the CQI index. The first 3 OFDM symbols are occupied by control signaling.

Assume no REs allocated to control signaling or higher layer signaling defines the starting symbol index of PDSCH or higher layer signaling defines the starting symbol index of ePDCCH where PDSCH starting symbol is the same as the starting symbol of ePDCCH. No resource elements used by primary or secondary synchronisation signals or PBCH. CP length of the non-MBSFN subframes may be used. Redundancy Version 0 may be used. If CSI-RS is used for channel measurements, the ratio of PDSCH EPRE to CSI-RS EPRE is as given. For transmission mode 9 CSI reporting, if UE is configured for PMI/RI reporting, assume DMRS overhead is consistent with most recent reported rank. For transmission model 10 CSI reporting, if UE is configured without PMI/RI reporting, assume DM-RS overhead is 12REs if the number of configured CSI-RS port is one and 24 REs if the number of configured CSI-RS ports is greater than one. As described, assume no REs allocated for CSI-RS and zero-power CSI-RS, no REs allocated for PRS, no REs allocated for Tracking RS (TRS), or no REs allocated for enhanced PDCCH (ePDCCH). The PDSCH transmission scheme depending on the transmission mode currently configured for the UE may be used or may be the default mode. If CRS is used for channel measurements, the ratio of PDSCH EPRE to cell-specific RS EPRE is as given with the exception of $p_A$ which shall be assumed to be $\rho_A = P_A + \Delta_{offset}$ [dB] for any modulation scheme, if the UE is configured with transmission mode 2 with 4 cell-specific antenna ports, or transmission mode 3 with 4 cell-specific antenna ports and the associated RI is equal to one $\rho_A = P_A + \Delta_{offset}$ [dB] for any modulation scheme and any number of layers, otherwise. The shift $\Delta$offset is given by the parameter nom PDSCH-RS-EPRE-Offset which is configured by higher-layer signaling.

When CQI estimation is performed by RS (TRS) for Time/frequency tracking, the UE is signaled $\Delta$offset of power from the eNB and the ?offset of power is used for the CQI estimation, herein the If RS (TRS) for Time/frequency tracking is used for CQI estimation, ratio of PDSCH PRE to RS (TRS) PRE is as given or PDSCH EPRE to RS (TRS) EPRE is as given.

Meanwhile, in CQI estimation, PDSCH transmission scheme assumed for CSI reference resources is applied by UE specific RS to demodulation of transmission scheme and by CSI-RS to CQI estimation in new carrier case. A CSI feedback is reduced by the channel reciprocity since downlink and uplink are used same frequency in TDD system. To CSI feedback support using the channel reciprocity, the PMI/RI of feedback is configured by high layer. In PMI/RI report, the PDSCH transmission scheme of CSI reference resources is assumed for transmission mode 9 which is applicable 8 layer transmission. Otherwise, if PMI/RI is not reported, the PDSCH transmission scheme of CSI reference resources is assumed for PDSCH transmission using single antenna port, the antenna port of the PDSCH is used for the same antenna port of RS (TRS) of the time/frequency tracking, or another is assumed by using single antenna port, the antenna port is a port 7 of UE specific RS and by transmitting CSI feedback with average CQI value calculated using the whole PMIs as defined for feedback.

Furthermore, resource allocation in a new carrier is described, to better support PRB bundling even with DCI format 1A scheduled PDSCH using DM-RS port 7, this invention proposes not to support distributed virtual resource block (DVRB) in DCI format 1A for TM 8/9. It is always assumed that DCI format 1A used in a new carrier including at least for SCell assigns resource allocation using localized VRB.

Meanwhile, this invention proposes a few approaches to accommodate low cost Machine Type Communication (MTC) in LTE system where MTC UEs may have the following characteristics. More details, the MTC is a form of data communication which involves one or more entities that do not necessarily need human interaction. A service optimized for the MTC differs from a service optimized for Human to Human communications (H2H). That is, the MTC refers to the concept of communication performed by a machine device, not a terminal used by a human user, by using the existing wireless communication network. The machine device used in the MTC can be called an MTC device. There are various MTC devices such as a vending machine, a machine of measuring a water level at a dam, etc.

For these reason, a new carrier may not have system bandwidth spanning PDCCH which may not be decodable by narrow-bandwidth MTC devices, i.e., which support smaller bandwidth than system bandwidth, the new carrier is a right candidate to support narrow-bandwidth MTC devices. When MTC is supported in NCT, the complexity of transmission mode 9 shall be addressed as MTC device may not have the capability to support all the features supported by TM 9 such as MU-MIMO. Thus, this invention proposes to use TM 9 fallback mode for MTC devices i.e., MTC UEs supported by DCI format 1A with single-antenna port 7 in TM 9. This will allow beamforming for MTC UEs, however will not support any MIMO capability. Alternatively, MTC devices are supported by a variation of TM 7 where the single antenna port 7 is used instead of antenna port 5 with DCI format 1/1A. The pattern of UE-specific RS in this case will follow the pattern of antenna port 7 rather than antenna port 5.

Also, transmission mode in a new carrier for Category-1 UE is supported in this invention. The Category-1 UE supports only single layer transmission, supporting TM 9 by Cat-1 UE may not be efficient. Similar to MTC devices, Cat-1 UE may support TM 9 with fall-back mode i.e., DCI format 1A only or a variation of TM 7 using single antenna port 7 instead of 5 with DCI format 1 can be used. The variation of TM 7 would be the same as TM 9 with a single antenna port 7, with a difference that the variation of TM 7 supports DCI format 1/1A whereas TM 9 supports DCI format 2C/1A. And PMI/RI Reporting Mechanisms in MTC and/or Cat-1 UE is described, for a UE which supports only rank=1 but may support MU-MIMO, it would be desirable to support only PMI reporting without reporting RI. This invention proposes a new CSI reporting mode as PMI-report which can be configured only when pmi-ri-report is not configured. When pmi-ri-report is not configured and pmi-report is configured, the UE shall report only PMI assuming rank=1. The PMI calculation is same as to pmi-ri-report is configured. When periodic CSI is used, single PMI is assumed. When a periodic CSI is used, multiple PMI can be assumed.

Figure 10:
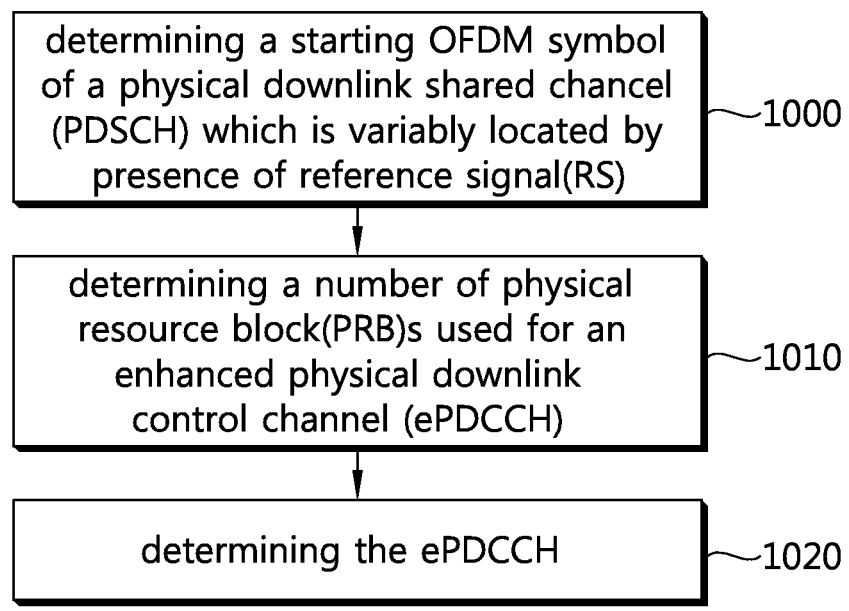
FIG. 10 shows an example of a flow chart for determining an enhanced PDCCH (ePDCCH) which can be multiplexed with PDSCH according to an exemplary embodiment of the present invention.

FIG. 10 shows an example of a flow chart for determining an enhanced PDCCH (ePDCCH) which can be multiplexed with PDSCH according to an exemplary embodiment of the present invention.

Referring to FIG. 10, a UE determines a starting OFDM symbol of PDSCH which is variably located by presence of reference signal (RS)s (1000), it is considered a transmission mode of the UE or PDSCH and each transmission mode is different by a corresponding RSs each is transmitted at allocated antenna port described according to FIG. 8 to FIG. 9.

And the UE determines a number of physical resource block (PRB)s used for an enhanced physical downlink control channel (ePDCCH) (1010), and receives the ePDCCH (1020). The ePDCCH is set by one or more sets of PRBs within the PDSCH configured for a UE to monitor the ePDCCH. That is, the UE determines ePDCCHs using the tables and equations described according to FIG. 8 to FIG. 9.

Herein, the UE determines a number of PRBs used for the ePDCCH which is allocated with PDSCH PRBs of a resource allocation by a Downlink Control Information (DCI), a number of PRBs overlapped between the PDSCH PRBs and the ePDCCH PRBs by the DCI, or a number of PRBs between the PDSCH PRBs and the ePDCCH PRBs are localized or distributed. Also, the UE determines the one or more set of the ePDCCH by indicating validation/activation of the DCI via a physical downlink control channel (PDCCH) or the ePDCCH, or determines the one or more set of the ePDCCH by signaling from a higher-layer signal as Semi-persistent Scheduling (SPS). The ePDCCH sets by a PQI (PDSCH RE mapping and Qausi-collocated Indicator) index, the PQI is indicated by PQI field in a DCI format 2D or a RRC signal configured for DCI format 1A. Thus, more efficient and accurate scheduling with lower complexity and reduction of control overhead of a master cell (as PCell), for multi-UEs and variable control information transmissions are supported in this invention.

Figure 11:
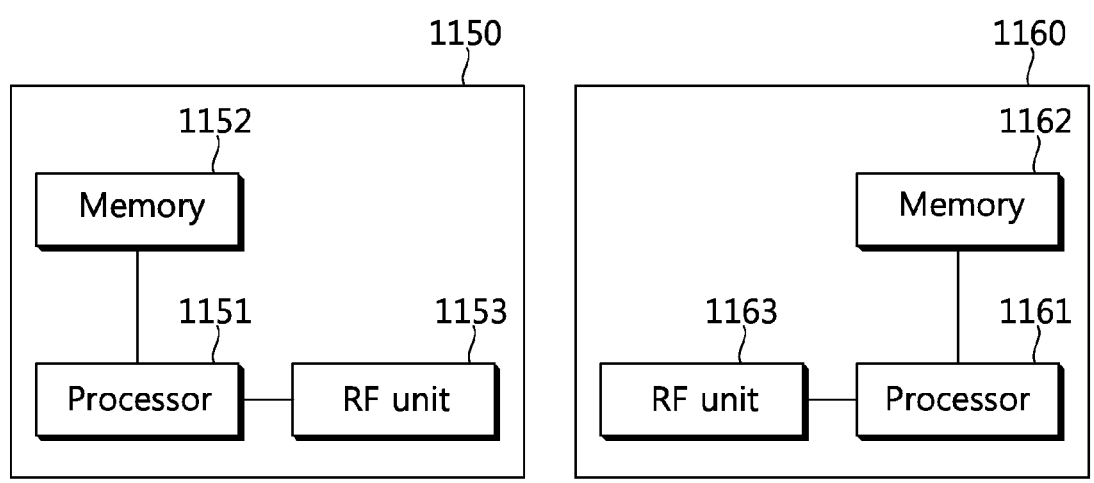
FIG. 11 shows a block diagram showing a wireless communication system according to an exemplary embodiment of the present invention.

FIG. 11 is a block diagram showing a wireless communication system according to an embodiment of the present invention.

A BS 1150 includes a processor 1151, a memory 1052, and a radio frequency (RF) unit 1153. The memory 1152 is coupled to the processor 1151, and stores a variety of information for driving the processor 1151. The RF unit 1153 is coupled to the processor 1151, and transmits and/or receives a radio signal. The processor 1151 implements the proposed functions, procedures, and/or methods. In the embodiments of FIG. 2 to FIG. 10, the operation of the BS can be implemented by the processor 1151.

Especially, the processor 1151 may configure one or more sets of the ePDCCH multiplexed with PDSCH by signaling from a higher-layer signal as Semi-persistent Scheduling (SPS) to lower scheduling complexity and control message overhead. The eNB may configure MBSFN subframes in a new carrier. Also, the processor 1151 may configure a transmission mode and antenna port for RSs based on a corresponding transmission mode. Furthermore, the processor 1151 may configure a DCI format of a UE to configure a transmission mode, the DCI includes a number of PRBs used for the ePDCCH which is allocated with PDSCH PRBs of a resource allocation by a Downlink Control Information (DCI), a number of PRBs overlapped between the PDSCH PRBs and the ePDCCH PRBs by the DCI, or a number of PRBs between the PDSCH PRBs and the ePDCCH PRBs are localized or distributed to a corresponding UE.

Whereas, a wireless device 1160 includes a processor 1161, a memory 1162, and an RF unit 1163. The memory 1162 is coupled to the processor 1161, and stores a variety of information for driving the processor 1161. The RF unit 1163 is coupled to the processor 1161, and transmits and/or receives a radio signal. The processor 1161 implements the proposed functions, procedures, and/or methods. In the embodiments of the FIG. 2 to FIG. 10, the operation of the UE can be implemented by the processor 1161.

Especially, the processor 1161 may receive a RRC signal including one or more sets of the ePDCCH multiplexed with PDSCH by signaling from a higher-layer signal as Semi-persistent Scheduling (SPS) or a DCI via PDCCH or ePDCCH. That is, the processor 1161 determines a starting OFDM symbol of a physical downlink shared chancel (PDSCH) which is variably located by presence of reference signal (RS), determines a number of physical resource block (PRB)s used for an enhanced physical downlink control channel (ePDCCH), and determines the ePDCCH, wherein the ePDCCH is set by one or more sets of PRBs within the PDSCH configured to a UE to monitor the ePDCCHs.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting and receiving data in a wireless communication system supporting multiple carriers, performed by a wireless device, the method comprising:
   determining a starting OFDM symbol of a physical downlink shared channel (PDSCH) which is variably located by the presence of a reference signal (RS);
   determining a number of physical resource blocks (PRBs) used for an enhanced physical downlink control channel (ePDCCH); and
   determining the ePDCCH;
   wherein the ePDCCH is set by one or more sets of PRBs within the PDSCH configured for a User Equipment (UE) to monitor the ePDCCH.

2. The method of claim 1, wherein determining the number of PRBs further comprises determining:
   a number of PRBs used for the ePDCCH which is allocated with PDSCH PRBs of a resource allocation by Downlink Control Information (DCI),
   a number of PRBs overlapped between the PDSCH PRBs and the ePDCCH PRBs by the DCI, or
   a number of PRBs between the PDSCH PRBs and the ePDCCH PRBs are localized or distributed.

3. The method of claim 2, further comprising:
   determining one or more sets of ePDCCHs by indicating validation/activation of the DCI via a physical downlink control channel (PDCCH) or the ePDCCH, or
   determining the one or more sets of ePDCCHs by signaling from a higher-layer signal.

4. The method of claim 2, wherein determining the number of PRBs further comprises:
 determining whether at least one of a scheduling DCI or PDSCH is transmitted from different transmission points,
 determining whether a PDSCH is rate matched or not rate matched according to the scheduling DCI, and
 determining an ePDCCH sets using a PQI (PDSCH RE mapping and Qausi-co-located Indicator) index associated with the ePDCCH sets, or a linked CRS or discovery signal in each of the PQI.

5. The method of claim 1, wherein determining the ePDCCH further comprises:
 determining one or more sets of ePDCCHs by a PQI (PDSCH RE mapping and Qausi-collocated Indicator) index.

6. The method of claim 5, wherein the PQI is indicated by a PQI field in a DCI format 2D or the PQI is indicated by a RRC signal configured for DCI format 1A.

7. The method of claim 5, wherein determining the ePDCCH further comprises:
 determining the one or more sets of ePDCCHs by a Cell specific RS (CRS), wherein the CRS includes a channel state information (CSI) RS assigned with a linked cell identification (ID) of transmission point.

8. The method of claim 1, wherein the starting OFDM symbol of the PDSCH is variably set at the 0th OFDM symbol or the 3rd OFDM symbol by the presence of a Cell specific RS (CRS).

9. The method of claim 1, wherein determining the ePDCCH further comprises:
 determining one or more sets of ePDCCHs which are indicated with different DCI formats according to a transmission mode of the UE.

10. The method of claim 1, determining the ePDCCH further comprises:
 determining the one or more sets of ePDCCHs by assuming that a tracking RS, a Demodulation reference signal (DM-RS), and a CSI-RS are Quasi-collocated (QCL).

11. A wireless device for transmitting and receiving data in a wireless communication system supporting multiple carriers, comprising:
 a radio frequency unit that receives a radio signal; and
 a processor, operatively coupled with the radio frequency unit, that:
 determines a starting OFDM symbol of a physical downlink shared channel (PDSCH) which is variably located by the presence of a reference signal (RS),
 determines a number of physical resource blocks (PRBs) used for an enhanced physical downlink control channel (ePDCCH), and
 determines the ePDCCH,
 wherein the ePDCCH is set by one or more set of PRBs within the PDSCH configured for a User Equipment (UE) to monitor the ePDCCH.

12. The wireless device of claim 11, wherein the processor further determines:
 a number of PRBs used for the ePDCCH which is allocated with PDSCH PRBs of a resource allocation by a Downlink Control Information (DCI),
 a number of PRBs overlapped between the PDSCH PRBs and the ePDCCH PRBs by the DCI, or
 a number of PRBs between the PDSCH PRBs and the ePDCCH PRBs are localized or distributed.

13. The wireless device of claim 11, wherein the processor further: determines one or more sets of ePDCCHs by indicating validation/activation of the DCI via a physical downlink control channel (PDCCH) or the ePDCCH, or by signaling from a higher-layer signal as a Semi-persistent Scheduling (SPS).

14. The wireless device of claim 11, wherein the processor is configured to: determine one or more sets of ePDCCHs by a PQI (PDSCH RE mapping and Qausi-collocated Indicator) index, wherein the PQI is indicated by a PQI field in a DCI format 2D or the PQI is indicated by a RRC signal configured for DCI format 1A.

15. The wireless device of claim 11, wherein the processor further: determines one or more sets of ePDCCHs by a Cell specific RS (CRS), wherein the CRS includes a channel state information (CSI) RS assigned with a linked cell identification (ID) of transmission point, and the starting OFDM symbol of the PDSCH is variably set at the 0th OFDM symbol or the 3rd OFDM symbol by the presence of the CRS.

16. The wireless device of claim 11, wherein the processor further: determines one or more sets of ePDCCHs which is indicated with different DCI formats according to a transmission mode of the UE.

17. A method for transmitting and receiving data in a wireless communication system supporting multiple carriers, performed by a wireless device, the method comprising:
 receiving a signal including a common search space (CSS) and UE specific search space (USS) for an enhanced physical downlink control channel (ePDCCH),
 determining cyclic prefix(CP) lengths for the CSS and the USS for the ePDCCH respectively, and
 determining the ePDCCH using the determined CP lengths,
 wherein a UE is configured with the same CP length for a commonly used CSS and USS for the ePDCCH or the UE is configured with separate CP lengths for a separately used CSS and USS for the ePDCCH.

* * * * *